US012309327B2

(12) United States Patent
Gold et al.

(10) Patent No.: US 12,309,327 B2
(45) Date of Patent: May 20, 2025

(54) AUTOMATED BEAM SCAN CALIBRATION, ALIGNMENT, AND ADJUSTMENT

(71) Applicant: General Electric Company, Schenectady, NY (US)

(72) Inventors: Scott Alan Gold, West Chester, OH (US); Xiaolei Shi, Niskayuna, OH (US)

(73) Assignee: General Electric Company, Evendale, OH (US)

( * ) Notice: Subject to any disclaimer, the term of this patent is extended or adjusted under 35 U.S.C. 154(b) by 943 days.

(21) Appl. No.: 17/183,576

(22) Filed: Feb. 24, 2021

(65) Prior Publication Data
US 2022/0272207 A1 Aug. 25, 2022

(51) Int. Cl.
*H04N 1/00* (2006.01)
*B22F 10/31* (2021.01)
*B23K 26/03* (2006.01)
*B23K 26/04* (2014.01)
*B33Y 10/00* (2015.01)
*B33Y 50/02* (2015.01)
(Continued)

(52) U.S. Cl.
CPC ......... *H04N 1/00018* (2013.01); *B22F 10/31* (2021.01); *B23K 26/032* (2013.01); *B23K 26/04* (2013.01); *B33Y 10/00* (2014.12); *B33Y 50/02* (2014.12); *H04N 1/00769* (2013.01); *H04N 1/488* (2013.01); *B23K 26/342* (2015.10)

(58) Field of Classification Search
None
See application file for complete search history.

(56) References Cited

U.S. PATENT DOCUMENTS 4,286,868 A * 9/1981 Laska ............... G03B 27/80
355/83
4,490,617 A * 12/1984 Loose ............. G01B 11/0691
356/637
(Continued)

FOREIGN PATENT DOCUMENTS

EP 3251844 6/2017
EP 3659726 B1 1/2023

OTHER PUBLICATIONS

German Patent Office Action for Application No. 102022100717.0 dated Dec. 22, 2023 (12 pages with English Translation).

*Primary Examiner* — Marcus H Taningco
*Assistant Examiner* — Djura Malevic
(74) *Attorney, Agent, or Firm* — Dinsmore & Shohl LLP

(57) ABSTRACT

A method of calibrating a beam scan field of an additive manufacturing machine in which a radiant energy beam is used to selectively melt material to form a workpiece, the method including: using a radiant energy source, directing a beam using a steering mechanism so as to create a calibration build job on a substrate, the calibration build job including at least one measurement artifact created by the beam; using a calibrated camera, collecting an image of the calibration build job; generating a set of measurements of the calibration build job from the image; comparing the measurements to a standard; in response to the measurements deviating from the standard by more than a predetermined acceptable tolerance, adjusting the steering mechanism; wherein the steps of directing, collecting, generating, comparing, and adjusting are carried out in response to automated commands from an electronic controller.

24 Claims, 14 Drawing Sheets

(51) Int. Cl.
*H04N 1/48* (2006.01)
*B23K 26/342* (2014.01)

(56) References Cited

U.S. PATENT DOCUMENTS

| | | | | |
|---|---|---|---|---|
| 5,774,177 A * | 6/1998 | Lane | ............... | G01N 33/367 382/111 |
| 5,786,889 A * | 7/1998 | Pope | ............... | F41G 3/326 250/342 |
| 5,821,990 A * | 10/1998 | Rudt | ............... | G05B 19/4184 348/125 |
| 5,832,415 A | 11/1998 | Wilkening et al. | | |
| 5,845,002 A * | 12/1998 | Heck | ............... | G01N 21/88 382/110 |
| 6,040,853 A * | 3/2000 | Delagnes | ............... | G01N 21/8903 73/104 |
| 6,281,502 B1 * | 8/2001 | Pineau | ............... | G01T 1/178 250/361 R |
| 6,553,275 B1 * | 4/2003 | Mazumder | ............... | B22F 10/25 700/121 |
| 6,580,959 B1 * | 6/2003 | Mazumder | ............... | G05B 19/4185 700/121 |
| 7,308,203 B1 * | 12/2007 | Koenck | ............... | H04B 7/18506 398/118 |
| 7,317,198 B2 * | 1/2008 | Aimonen | ............... | G01N 21/8903 250/559.01 |
| 7,402,794 B2 * | 7/2008 | Kim | ............... | H01Q 21/06 250/250 |
| 7,411,196 B2 * | 8/2008 | Kalayeh | ............... | G01S 17/86 250/342 |
| 7,420,162 B2 * | 9/2008 | Wille | ............... | A61B 6/4258 250/300 |
| 7,515,681 B2 * | 4/2009 | Ebstein | ............... | G01T 1/29 378/19 |
| 7,541,588 B2 * | 6/2009 | Tabirian | ............... | G01S 17/89 250/341.1 |
| 7,623,230 B2 * | 11/2009 | Porjo | ............... | G12B 13/00 250/252.1 |
| 7,772,563 B2 * | 8/2010 | Le Goaller | ............... | G01T 1/1648 250/390.09 |
| 7,773,204 B1 * | 8/2010 | Nelson | ............... | G01S 13/48 356/5.02 |
| 7,781,739 B1 * | 8/2010 | Jannson | ............... | G01T 1/29 250/389 |
| 8,049,870 B2 * | 11/2011 | Mosier | ............... | G01S 3/7865 356/29 |
| 8,193,511 B2 * | 6/2012 | Goto | ............... | H01J 37/21 250/397 |
| 8,237,788 B2 | 8/2012 | Cooper et al. | | |
| 8,351,035 B2 * | 1/2013 | Goohs | ............... | G01N 21/53 356/342 |
| 8,384,044 B2 * | 2/2013 | Sugiura | ............... | G01N 21/6452 250/361 R |
| 9,046,619 B2 * | 6/2015 | Blackburn | ............... | G01V 5/0069 |
| 9,105,077 B2 | 8/2015 | Wersborg et al. | | |
| 9,335,211 B2 * | 5/2016 | Vasic | ............... | G07D 7/1205 |
| 9,355,441 B2 | 5/2016 | Wersborg et al. | | |
| 9,373,163 B2 | 6/2016 | Wersborg et al. | | |
| 9,383,321 B2 * | 7/2016 | Nakanishi | ............... | G01N 21/6489 |
| 9,429,521 B2 * | 8/2016 | Kramer | ............... | G01N 33/025 |
| 9,494,512 B2 * | 11/2016 | Wu | ............... | G01N 21/3581 |
| 9,523,776 B2 * | 12/2016 | Kuroda | ............... | G01T 1/178 |
| 9,696,142 B2 * | 7/2017 | Bamberg | ............... | B22F 10/38 |
| 9,702,248 B2 * | 7/2017 | Chen | ............... | E21B 49/08 |
| 9,724,876 B2 | 8/2017 | Cheverton et al. | | |
| 9,925,715 B2 | 3/2018 | Cheverton et al. | | |
| 9,989,396 B2 * | 6/2018 | Gold | ............... | B33Y 50/02 |
| 9,989,495 B2 * | 6/2018 | Gold | ............... | B22F 10/85 |
| 10,073,060 B2 * | 9/2018 | Redding | ............... | B33Y 50/02 |
| 10,113,894 B2 * | 10/2018 | Gold | ............... | G01P 5/00 |
| 10,393,914 B2 * | 8/2019 | Tao | ............... | G01V 5/0075 |
| 10,739,276 B2 * | 8/2020 | Pettibone | ............... | G01J 1/0437 |
| 10,914,677 B2 * | 2/2021 | Gold | ............... | G01J 5/10 |
| 10,962,507 B2 * | 3/2021 | Gold | ............... | B29C 64/153 |
| 11,648,730 B2 * | 5/2023 | Gold | ............... | B33Y 10/00 73/1.82 |
| 12,097,558 B2 * | 9/2024 | Travis | ............... | B22F 12/90 |
| 2004/0120844 A1 * | 6/2004 | Tribelsky | ............... | B82Y 30/00 422/38 |
| 2006/0022115 A1 * | 2/2006 | Byren | ............... | G02B 26/06 250/201.9 |
| 2007/0075460 A1 * | 4/2007 | Wahlstrom | ............... | B29C 64/182 264/401 |
| 2007/0181815 A1 * | 8/2007 | Ebstein | ............... | G01T 1/023 250/370.11 |
| 2009/0040299 A1 * | 2/2009 | Harrison | ............... | H01S 3/0014 348/135 |
| 2009/0078883 A1 * | 3/2009 | Perel | ............... | H01J 37/244 250/396 R |
| 2010/0059665 A1 * | 3/2010 | Sampayan | ............... | H05H 9/00 977/762 |
| 2010/0265078 A1 * | 10/2010 | Friedman | ............... | H01L 31/115 340/600 |
| 2011/0006212 A1 * | 1/2011 | Shchory | ............... | A61B 6/4258 378/65 |
| 2012/0112076 A1 * | 5/2012 | Rosson | ............... | G01T 7/00 250/361 R |
| 2013/0168902 A1 * | 7/2013 | Herzog | ............... | B33Y 30/00 264/401 |
| 2016/0236279 A1 | 8/2016 | Ashton et al. | | |
| 2016/0303806 A1 * | 10/2016 | Mercelis | ............... | B29C 64/386 |
| 2017/0144223 A1 * | 5/2017 | Gold | ............... | B28B 1/001 |
| 2017/0144250 A1 * | 5/2017 | Gold | ............... | B23K 26/0648 |
| 2017/0146382 A1 * | 5/2017 | Gold | ............... | B22F 12/90 |
| 2017/0146488 A1 * | 5/2017 | Gold | ............... | G01N 29/4427 |
| 2017/0146489 A1 * | 5/2017 | Redding | ............... | B29C 64/153 |
| 2017/0173695 A1 * | 6/2017 | Myerberg | ............... | B29C 64/106 |
| 2017/0203512 A1 * | 7/2017 | Gold | ............... | B22F 12/90 |
| 2017/0203517 A1 * | 7/2017 | Crear | ............... | B23K 26/082 |
| 2017/0246810 A1 * | 8/2017 | Gold | ............... | B29C 64/386 |
| 2017/0252805 A1 * | 9/2017 | Gillespie | ............... | C04B 35/62204 |
| 2017/0310935 A1 * | 10/2017 | Sinclair | ............... | B29C 64/245 |
| 2018/0089824 A1 | 3/2018 | Bevan | | |
| 2018/0093416 A1 | 4/2018 | Prexler et al. | | |
| 2018/0136633 A1 * | 5/2018 | Small | ............... | G06Q 30/018 |
| 2018/0185963 A1 * | 7/2018 | Ostroverkhov | ............... | B28B 1/001 |
| 2018/0207750 A1 | 7/2018 | Carter | | |
| 2018/0252568 A1 * | 9/2018 | Gold | ............... | B33Y 50/02 |
| 2018/0281067 A1 | 10/2018 | Small et al. | | |
| 2018/0290239 A1 | 10/2018 | Haro Gonzalez et al. | | |
| 2018/0369912 A1 * | 12/2018 | Gold | ............... | B33Y 40/00 |
| 2019/0025109 A1 * | 1/2019 | Gold | ............... | B33Y 50/02 |
| 2019/0134748 A1 * | 5/2019 | Roychowdhury | ............... | B23K 26/342 |
| 2019/0248075 A1 * | 8/2019 | Klaußner | ............... | B29C 64/153 |
| 2019/0323951 A1 * | 10/2019 | Gold | ............... | G01N 21/274 |
| 2020/0164588 A1 * | 5/2020 | Vaes | ............... | B29C 64/153 |
| 2020/0166482 A1 * | 5/2020 | Gold | ............... | B33Y 50/02 |
| 2021/0181162 A1 * | 6/2021 | Gold | ............... | B22F 12/90 |
| 2022/0272207 A1 * | 8/2022 | Gold | ............... | B23K 26/032 |
| 2022/0339705 A1 * | 10/2022 | Travis | ............... | B22F 12/90 |

* cited by examiner

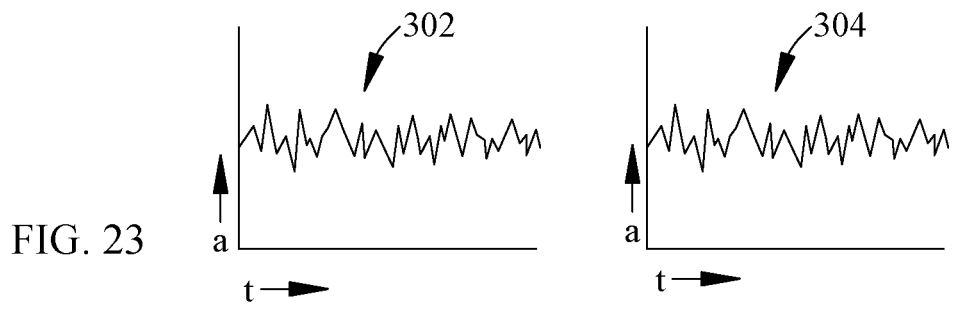
FIG. 23
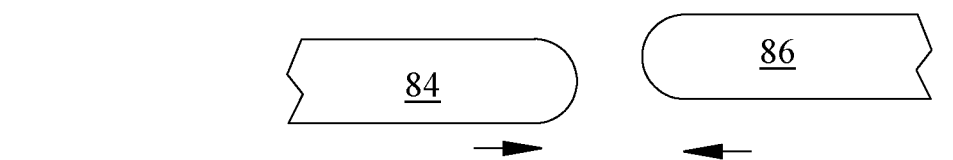
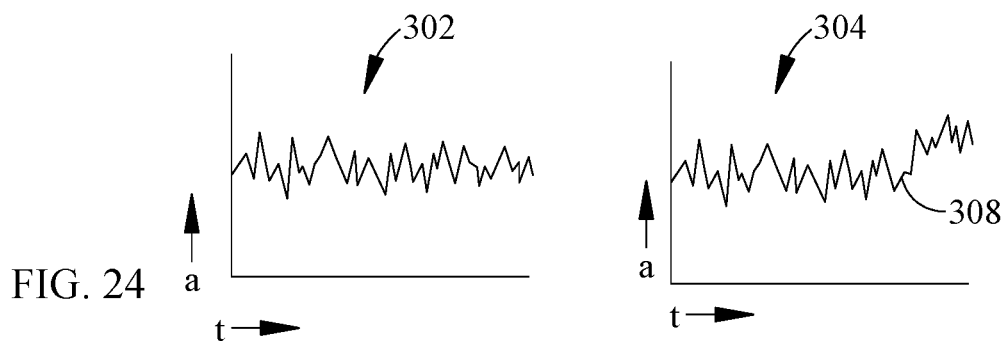
FIG. 24
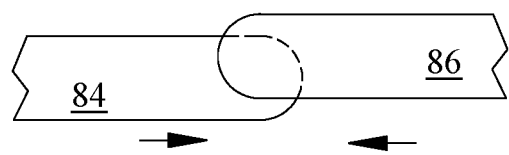
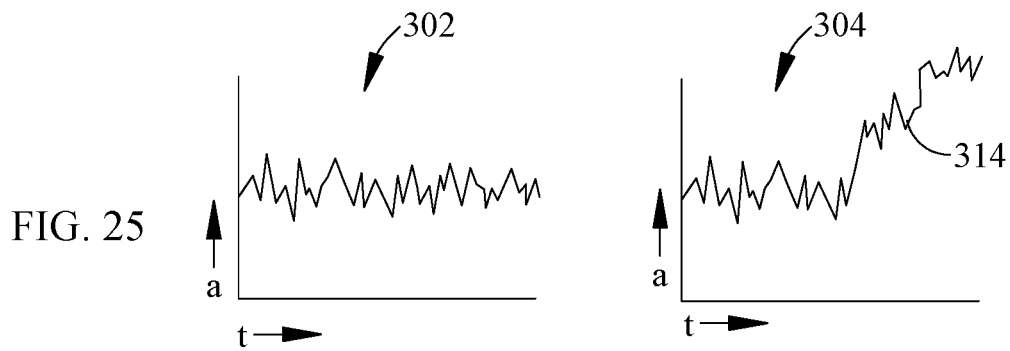
FIG. 25
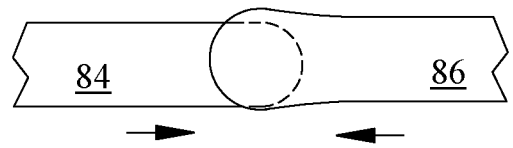

AUTOMATED BEAM SCAN CALIBRATION, ALIGNMENT, AND ADJUSTMENT

BACKGROUND OF THE INVENTION

This invention relates generally to additive manufacturing, and more particularly to apparatus and methods for alignment of energy beams in additive manufacturing.

Additive manufacturing is a process in which material is built up layer-by-layer to form a component. Additive manufacturing is also referred to by terms such as "layered manufacturing," and "reverse machining." Such terms are treated as synonyms for purposes of the present invention.

One type of additive manufacturing machine is referred to as a "powder bed" or Direct Metal Laser Melting ("DMLM") machine and includes a build chamber that encloses a mass of powder that is selectively fused by a radiant energy beam to form a workpiece. This type of machine may be provided with multiple optical systems or beam generators that produce multiple radiant energy beams (e.g., lasers) to speed the build process. Each beam is capable of being swept over its own independent scan field. Calibration and relative alignment of the independent scan fields is critical for achieving quality parts in multi-beam additive manufacturing machines.

One problem with prior calibration processes is that they are largely manual processes. As a consequence, they are slow; for example, they can consume an entire day.

BRIEF DESCRIPTION OF THE INVENTION

This problem is addressed by a method for automated calibration and adjustment of beam scan fields using at least one of a calibrated camera and a melt pool emissions sensor.

According to one aspect of the technology described herein, a method is described for calibrating a beam scan field of an additive manufacturing machine in which a radiant energy beam is used to selectively melt material to form a workpiece. The method includes: directing a radiant energy beam using a beam steering mechanism of the beam generator so as to create a calibration build job on a substrate, the calibration build job including at least one measurement artifact created by the radiant energy beam; using a calibrated camera, collecting an image of the calibration build job; generating a set of measurements of the calibration build job from the image; comparing the measurements to a standard; in response to the measurements deviating from the standard by more than a predetermined acceptable tolerance, adjusting the beam steering mechanism; and wherein the steps of directing, collecting, generating, comparing, and adjusting are carried out in response to automated commands from an electronic controller.

According to another aspect of the technology described herein, a method is described of calibrating beam scan fields of an additive manufacturing machine including two or more beam generators each including a radiant energy source and a beam steering mechanism. The method includes: using the beam steering mechanisms, directing a radiant energy beam from each of the beam generators to selectively melt material, such that each radiant energy beam forms a separate portion of a build job, wherein each radiant energy beam creates a melt pool; using one or more emissions sensors, monitoring emissions from the melt pools; comparing the emissions to a standard; in response to the emissions deviating from the standard by more than a predetermined acceptable tolerance, adjusting one or more of the beam generators; and wherein the steps of directing, monitoring, comparing, and adjusting are carried out in response to automated commands from an electronic controller.

BRIEF DESCRIPTION OF THE DRAWINGS

The invention may be best understood by reference to the following description taken in conjunction with the accompanying drawing figures in which:

FIG. 23 is a schematic top plan view of first and second weld beads that are misaligned and do not overlap, along with graphs showing emissions sensor data of the bead formation;

FIG. 24 is a schematic top plan view of first and second weld beads that are misaligned but do overlap properly, along with graphs showing emissions sensor data of the bead formation;

FIG. 25 is a schematic top plan view of first and second weld beads that are misaligned and overlap excessively, along with graphs showing emissions sensor data of the bead formation;

DETAILED DESCRIPTION OF THE INVENTION

Figure 1:
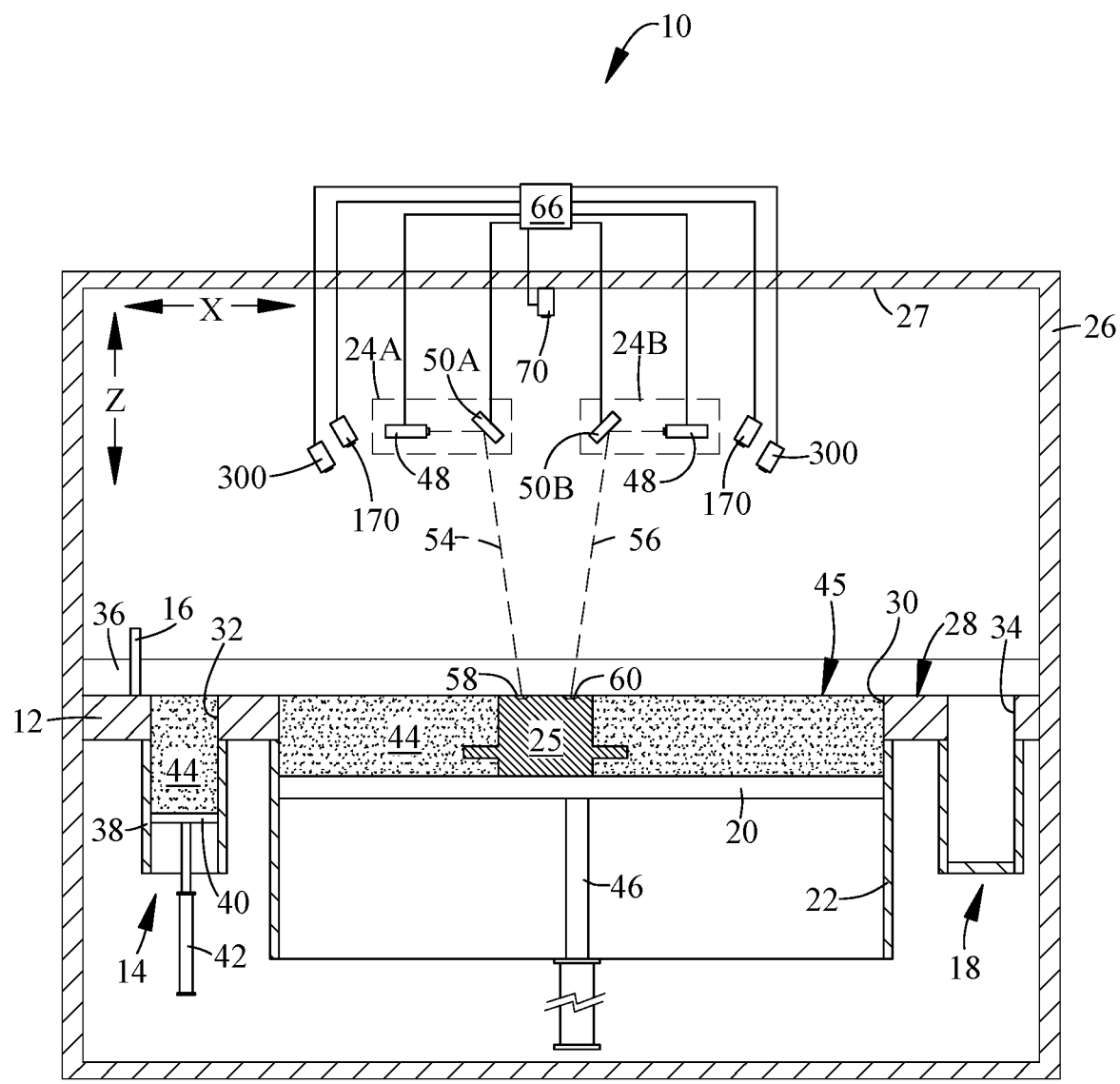
FIG. 1 is a schematic, partially-sectioned front elevation view of an exemplary additive manufacturing machine including a build chamber therein.
Figure 2:
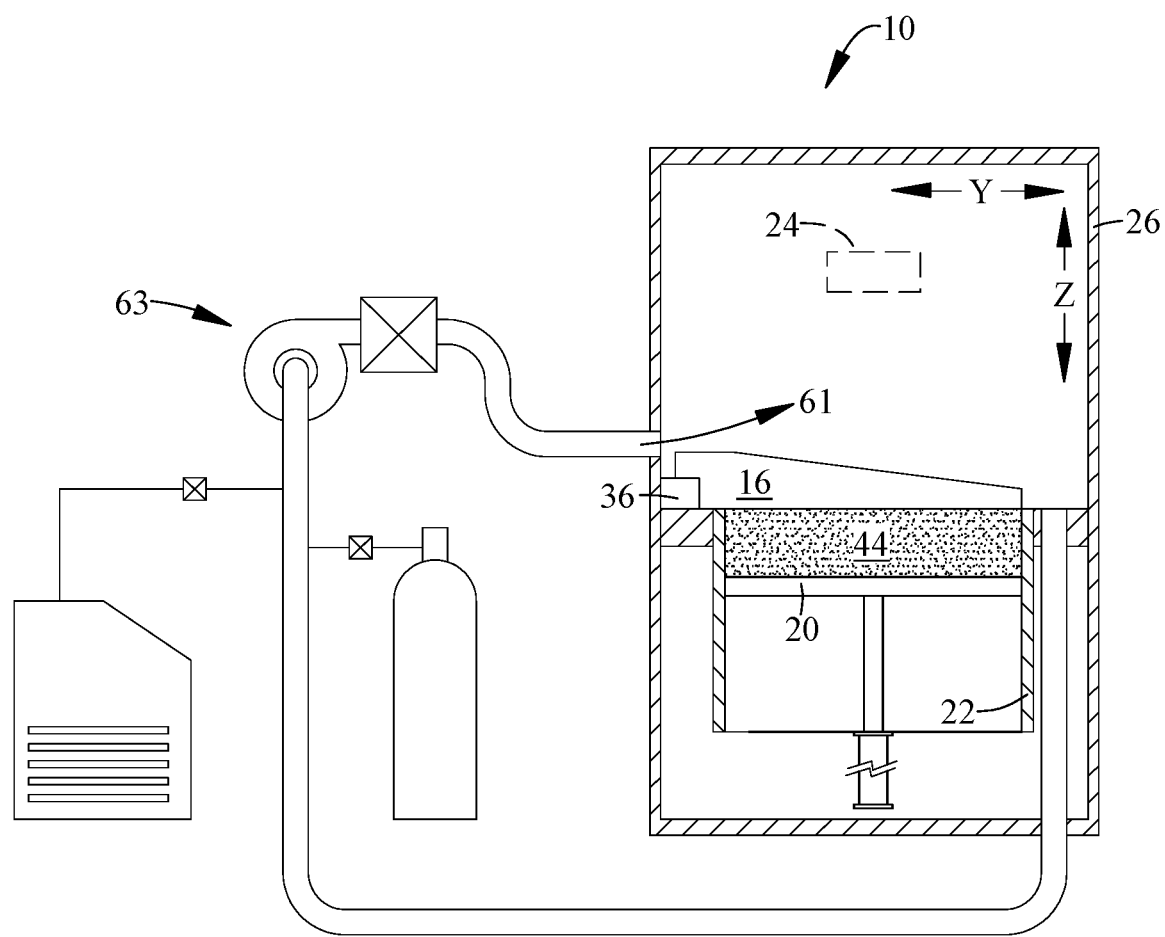
FIG. 2 is a schematic side view of the machine of FIG. 1.

Referring to the drawings wherein identical reference numerals denote the same elements throughout the various views, FIGS. 1 and 2 illustrate schematically an additive manufacturing machine 10 suitable for carrying out an additive manufacturing method. The machine 10 and its operation are a representative example of a "powder bed machine".

It will be understood that the machine 10 is merely used as an example to provide context for describing the principles of the present invention. The principles described herein are applicable to other configurations of powder bed machines, as well as to other types of additive manufacturing machines and related processes. More generally, the principles described herein would be applicable to any manufacturing process in which a melt pool is generated. Nonlimiting examples of such processes include electron-beam melting ("EBM"), directed energy deposition ("DED"), and laser welding. The term "manufacturing process" could also encompass repair processes where components are built up or joined together using a technique that generates a melt pool.

Basic components of the machine 10 include a table 12, a powder supply 14, a recoater 16, an overflow container 18, a build platform 20 surrounded by a build chamber 22, and at least one beam generator (denoted 24 generally), all surrounded by a housing 26. Each of these components will be described in more detail below.

The table 12 is a rigid structure defining a planar worksurface 28. The worksurface 28 is coplanar with and defines a virtual workplane. In the illustrated example, it includes a build opening 30 communicating with the build chamber 22 and exposing the build platform 20, a supply opening 32 communicating with the powder supply 14, and an overflow opening 34 communicating with the overflow container 18.

The recoater 16 is a rigid, laterally-elongated structure that lies on the worksurface 28. It is connected to an actuator 36 operable to selectively move the recoater 16 along the worksurface 28. The actuator 36 is depicted schematically in FIG. 1, with the understanding that devices such as ballscrew or linear electric actuators, pneumatic or hydraulic cylinders, and so forth, may be used for this purpose.

The powder supply 14 comprises a supply container 38 underlying and communicating with the supply opening 32, and an elevator 40. The elevator 40 is a plate-like structure that is vertically slidable within the supply container 38. It is connected to an actuator 42 operable to selectively move the elevator 40 up or down. The actuator 42 is depicted schematically in FIG. 1, with the understanding that devices such as ballscrew or linear electric actuators, pneumatic or hydraulic cylinders, and so forth, may be used for this purpose. When the elevator 40 is lowered, a supply of powder 44 of a desired composition (for example, metallic, polymeric, ceramic, and/or organic powder) may be loaded into the supply container 38. When the elevator 40 is raised, it exposes the powder 44 above the worksurface 28. Other types of powder supplies may be used; for example, powder may be dropped into the build chamber 22 by an overhead device (not shown).

The build platform 20 is a plate-like structure that is vertically slidable below the build opening 30. It is connected to an actuator 46 operable to selectively move the build platform 20 up or down. The actuator 46 is depicted schematically in FIG. 1, with the understanding that devices such as ballscrew or linear electric actuators, pneumatic or hydraulic cylinders, and so forth, may be used for this purpose. When the build platform 20 is lowered into the build chamber 22 during a build process, the build chamber 22 and the build platform 20 collectively surround and support a mass of powder 44 along with any components being built. This mass of powder is generally referred to as a "powder bed", and this specific category of additive manufacturing process may be referred to as a "powder bed process".

The overflow container 18 underlies and communicates with the overflow opening 34 and serves as a repository for excess powder 44.

The machine 10 incorporates two or more beam generators operable to generate an energy beam and direct it as desired. As will be explained in more detail below, any number of beam generators 24 may be provided and used simultaneously to increase the production speed of the machine 10. In the illustrated example, two beam generators 24A, 24B are shown.

Each beam generator 24A, 24B, includes a directed energy source 48 and a beam steering mechanism (referred to at 50 generally). The individual beam steering mechanisms are denoted 50A, 50B respectively. The directed energy source 48 may comprise any device operable to generate a beam of suitable power and other operating characteristics to melt and fuse the powder 44 during the build process, described in more detail below. For example, the directed energy source 48 may be a laser. Other directed-energy sources such as electron beam guns are suitable alternatives to a laser.

Each beam steering mechanism 50A, 50B may include one or more mirrors, prisms, and/or lenses, and may be provided with suitable actuators and arranged so that a beam from the directed energy source 48 can be focused to a desired spot size and steered to a desired position in plane coincident with the worksurface 28. For purposes of convenient description, this plane may be referred to as a X-Y plane, and a direction perpendicular to the X-Y plane is denoted as a Z-direction (X, Y, and Z being three mutually perpendicular directions). The beam may be referred to herein as a "build beam".

One known type of beam steering mechanism incorporates two mirrors that sequentially receive a build beam and redirect it to a desired focal spot. Each mirror is connected to and selectively pivoted by its own galvanometer, commonly referred to as a "galvo". This type of beam steering mechanism receives independent inputs or drive signals (e.g., variable voltage signals) for beam sweep or beam pointing in two mutually perpendicular planes. For example, one galvo may pivot the beam in a X-Z plane, resulting in the beam focal spot moving in the X-direction on the worksurface 28. The other galvo may pivot the beam in a Y-Z plane, resulting in the beam focal spot moving in the Y-direction on the worksurface 28. The sum of the two motions produces a desired movement of the beam focal spot to any X-Y position on the worksurface 28. The beam steering mechanisms 50A, 50B and their operation are discussed in greater detail below.

The housing 26 serves to isolate and protect the other components of the machine 10. During a build process, and as shown in FIG. 2, the housing 26 is provided with a flow 61 of an appropriate shielding gas that, among other functions, excludes oxygen from the build environment. The composition of the gas used may be similar to that used as shielding gas for conventional welding operations. For example, gases such as nitrogen, argon, or mixtures thereof may be used. Any convenient source 63 of gas may be used, such as a nitrogen generator or more pressurized gas cylinders.

The operation of the machine 10 may be controlled, for example, by software running on one or more processors embodied in one or more devices referred to as an electronic "controller", such as a programmable logic controller ("PLC") or a microcomputer (shown schematically at 66 in FIG. 1). Such processors may be coupled to the sensors and operating components, for example, through wired or wireless connections. The same processor or processors may be used to retrieve and analyze sensor data, for statistical analysis, and for feedback control. The functions of the controller 66 may be performed by one single device integrated with the machine 10, or by some combination of devices that need not be integral to the machine 10.

An exemplary basic build process for a workpiece 25 using the apparatus described above is as follows. The build platform 20 is positioned below the worksurface 28 by a selected layer increment. The layer increment affects the speed of the additive manufacturing process and the resolution of the workpiece 25. As an example, the layer increment may be about 10 to 50 micrometers. Powder 44 is then deposited over the build platform 20. For example, the elevator 40 of the supply container 38 may be raised to push powder through the supply opening 32, exposing it above the worksurface 28. The recoater 16 is moved across the worksurface 28 to spread the raised powder 44 horizontally over the build platform 20. Any excess powder 44 drops through the overflow opening 34 into the overflow container 18 as the recoater 16 passes from left to right. Subsequently, the recoater 16 may be moved back to a starting position. The leveled powder 44 may be referred to as a "build layer" and the exposed upper surface thereof may be referred to as a "build surface", designated 45.

The beam generators 24A, 24B are used to melt a two-dimensional cross-section or layer of the workpiece 25 being built. Within each beam generator 24A, 24B, the directed energy source 48 emits a beam and the respective beam steering mechanism 50A, 50B is used to steer a focal spot of the corresponding build beam 54, 56 over the exposed powder surface in an appropriate pattern. A small portion of the exposed layer of the powder 44 surrounding the focal spot, referred to herein as a "melt pool" is heated by the build beam to a temperature allowing it to sinter or melt, flow, and consolidate. This step may be referred to as "fusing" the powder 44. As an example, the melt pool may be on the order of 100 micrometers wide. In the illustrated example using two beam generators 24A, 24B, the first build beam 54 generates a first melt pool 58 and the second build beam 56 generates a second melt pool 60.

The build platform 20 is then moved vertically downward by the layer increment, and another layer of powder 44 is applied in a similar thickness. The beam generators 24A, 24B again emit build beams 54, 56 and the beam steering mechanisms 50A, 50B are used to steer the focal spots of the build beams 54, 56 over the exposed powder surface in an appropriate pattern. The exposed layer of the powder 44 is heated by the build beams 54, 56 to a temperature allowing it to fuse as described above, and consolidate both within the top layer and with the lower, previously-solidified layer.

This cycle of moving the build platform 20, applying powder 44, and then directed energy fusing the powder 44 is repeated until the entire workpiece 25 is complete.

As noted above, the machine 10 and its operation are a representative example of a "powder bed machine". It will be understood that the principles described here are applicable to other configurations of powder bed machines, as well as to other types of additive manufacturing machines. Furthermore, the principles described herein are applicable to any machine or device having at least one steerable directed energy beam having a scan field that must be aligned.

Prior to operation of the machine 10 to build a workpiece 25 using the process described above, it is necessary to calibrate and align the scan fields of the beam generators 24A, 24B. Typically, the physical range of motion of each beam steering mechanism 50A, 50B in each axis is sufficient that the build beam can sweep out a range greater than the size of the worksurface 28. Thus, "calibration" or "adjustment" of an individual galvo may typically be effected by changing the parameters of a software transfer function that determines the value of a drive signal delivered to each galvo. In addition to, or as an alternative to, software adjustment, a mechanical adjustment (e.g., an adjustable mounting bracket) may be provided.

In the prior art, it is typical to calibrate and align the scan fields of multi-beam machines by using the build beam to burn a pattern on paper or a similar substrate. One test pattern or set of measurement artifacts is created by each beam generator 24A, 24B. Each of the individual test patterns is then scanned with an appropriate device, such as an optical document scanner, to produce a set of measurements. The set of measurements may be evaluated to determine the positional accuracy of the beam generator 24A, 24B, e.g., by measuring distances between gridlines in the grid pattern. The gridlines may also be measured to determine their accuracy in position and rotation. The corresponding beam generator 24A, 24B is then adjusted to compensate for the error in position and rotation. The intended result is that when each of the plurality of beam generators 24A, 24B is aligned to a nominal or desired position, the multiple scan fields will be mutually aligned or calibrated. This prior art process is fundamentally manual and may require on the order of a full working day to complete.

One or more aspects of the machine calibration and scan field alignment may be automated to produce faster, more consistent results. Different sensing techniques may be used to facilitate the automation process.

In one technique, one or more cameras are used to image structures created by the machine 10, determine if the structures are in the proper position within predetermined tolerances, and adjust machine 10 as necessary to bring the results into tolerance.

To use this technique, additive manufacturing machine 10 may be provided with a camera 70. In general, the term "camera" as used herein refers to a device that is operable to produce a digital image of the build surface 45 comprising an array of individual image elements, i.e., pixels for a 2-D array. The camera 70 is operable to produce, for each image element, a measurement of at least one physical property. The measurement may include at least one scalar value such as brightness. Alternatively, the camera 70 may produce a signal representative of multiple factors, for example RGB color values. The camera 70 is also operable to produce relative or absolute positional information for each image element. For example, the output of the camera 70 for a particular image element 74 may be in the format X, Y, B where X equals X-position, Y equals Y-position, and B equals brightness.

Nonlimiting examples of suitable devices that may be used for the camera 70 include photodiode arrays, photomultiplier tube ("PMT") arrays, or digital cameras (e.g., CMOS or CCD).

In the illustrated example, the camera 70 is depicted as a digital camera placed so that its field-of-view encompasses the build surface 45. For example, it may be mounted to a roof 27 of the housing 26, roughly over the center of the build surface 45.

Prior to use, the camera 70 may be calibrated to ensure its accuracy. It will be understood that the camera 70 is subject to different kinds of errors and distortions related to its physical characteristics, e.g., the characteristics of the optics such as lenses and mirrors and the sensors used, as well as its installation, e.g., position and orientation relative to the build surface 45. The purpose of the calibration process is to ensure that the errors and distortions are compensated for so as to produce reliable information.

An exemplary process for calibrating the camera 70 is as follows. First, a fixed reference such as a grid of lines or array of points etched on plate of glass (not shown) is used to calibrate a conventional optical document scanner or similar device (not shown).

Figure 3:
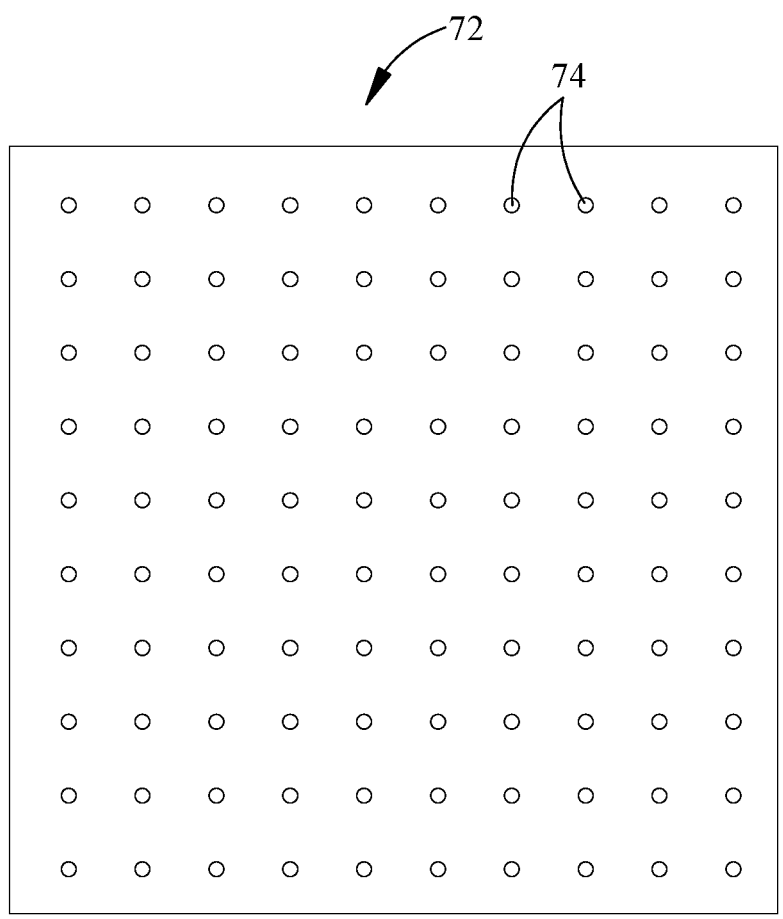
FIG. 3 is a schematic top plan view of a camera calibration pattern.

Next, a camera calibration pattern is created by one or both of the build beams 54, 56 to burn a pattern on paper or similar substrate. An exemplary camera calibration pattern 72 is shown in FIG. 3. It comprises an array of measurement artifacts 74, defined as elements that can be observed and measured using appropriate instruments.

Figure 4:
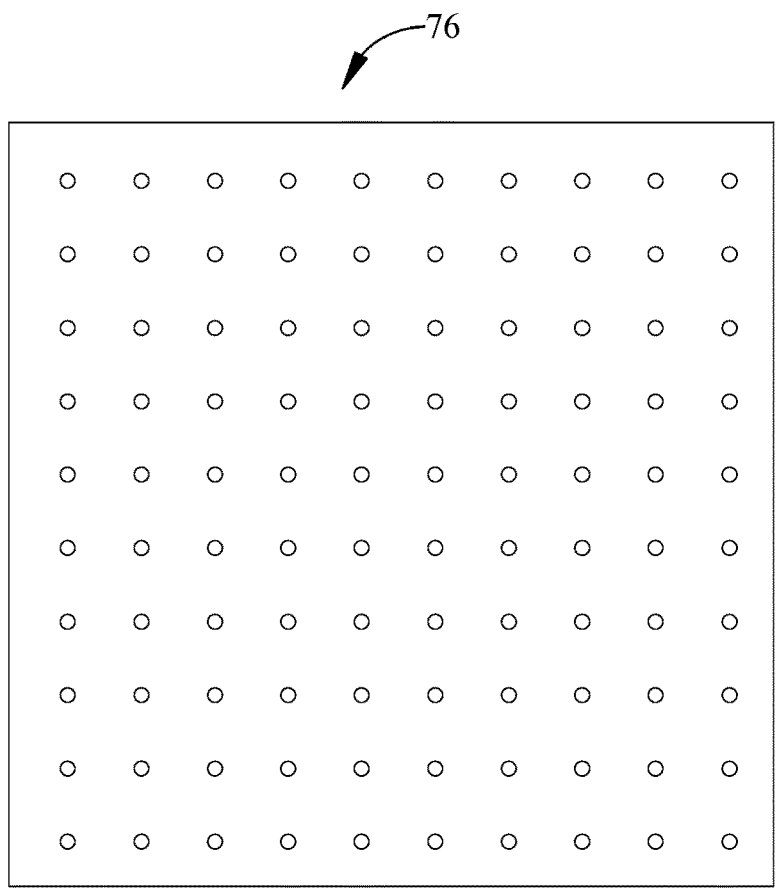
FIG. 4 is a schematic view of a reference image.

Next, the camera calibration pattern 72 is scanned using the optical document scanner to verify the measurement artifact locations. In practice, the optical document scanner is not subject to the same errors or distortions as the camera 70. The output of the optical document scanner is a reference image 76, shown in FIG. 4.

Figure 5:
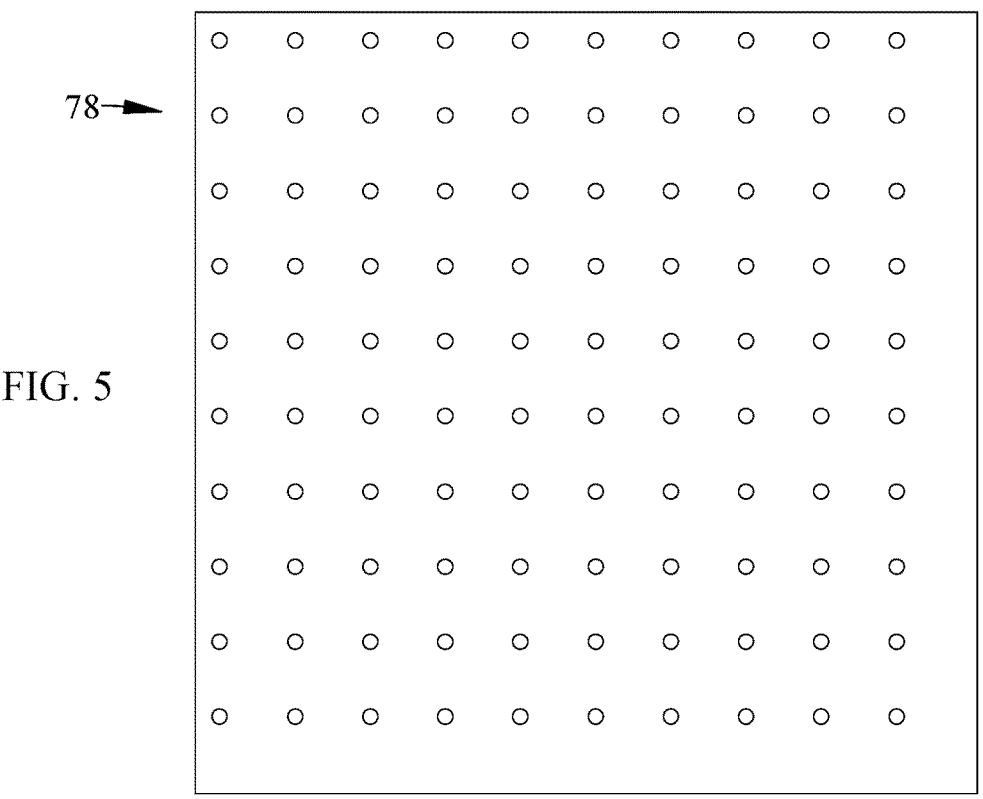
FIG. 5 is a schematic view of a raw image captured by a camera, where the raw image is skewed from an actual position.

Next, the camera calibration pattern 72 is imaged using the camera 70, producing a "raw" image 78 (FIG. 5).

Figure 6:
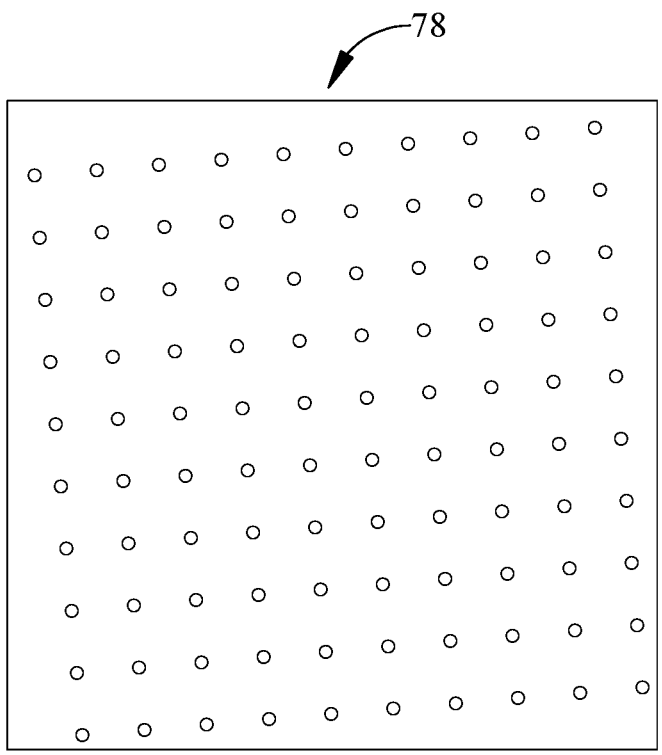
FIG. 6 is a schematic view of a raw image captured by a camera, where the raw image is rotated from an actual position.
Figure 7:
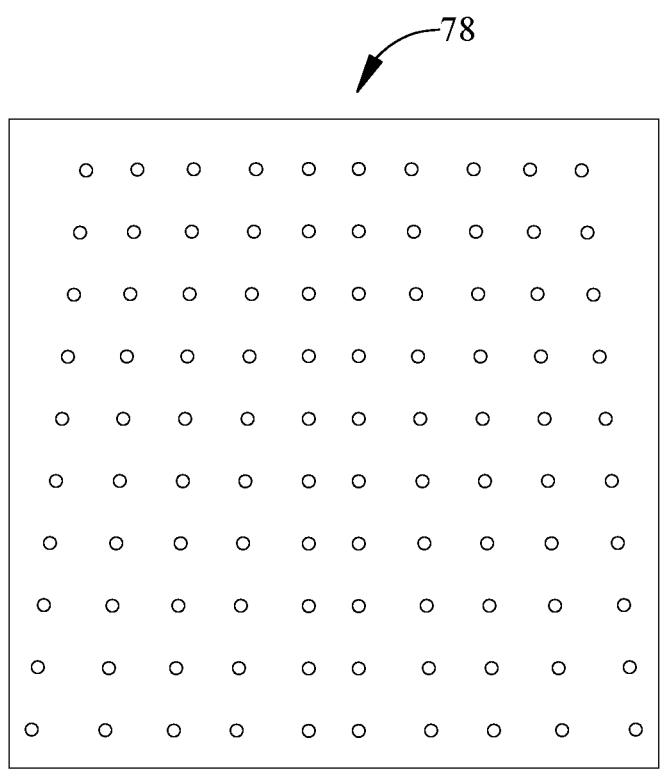
FIG. 7 is a schematic view of a raw image captured by a camera, where the raw image contains a parallax error.

Once in possession of the raw image 78 and the reference image, appropriate software is used to fit a mathematical transfer function that maps each point of the raw image to the reference image 76. Numerous types of errors are possible in the raw image 78 when compared to the reference image 76. For example, FIG. 5 shows the raw image 78 being laterally offset or skewed from an actual position. FIG. 6 shows the raw image 78 being rotated relative to an actual position, and FIG. 7 shows the raw image 78 having a distorted shape (e.g., parallax error) relative to the actual shape. The transfer function provides the basis for calibration of the camera 70 by correcting the raw data. More specifically, the transfer function translates the position of each point in the raw image 78 from a measured position to a corrected position. In subsequent use, the corrected positions are used instead of the raw positions from the camera 70.

Once the camera 70 has been calibrated, it is suitable for use for automated calibration and adjustment of the beam generators 24A, 24B.

Figure 8:
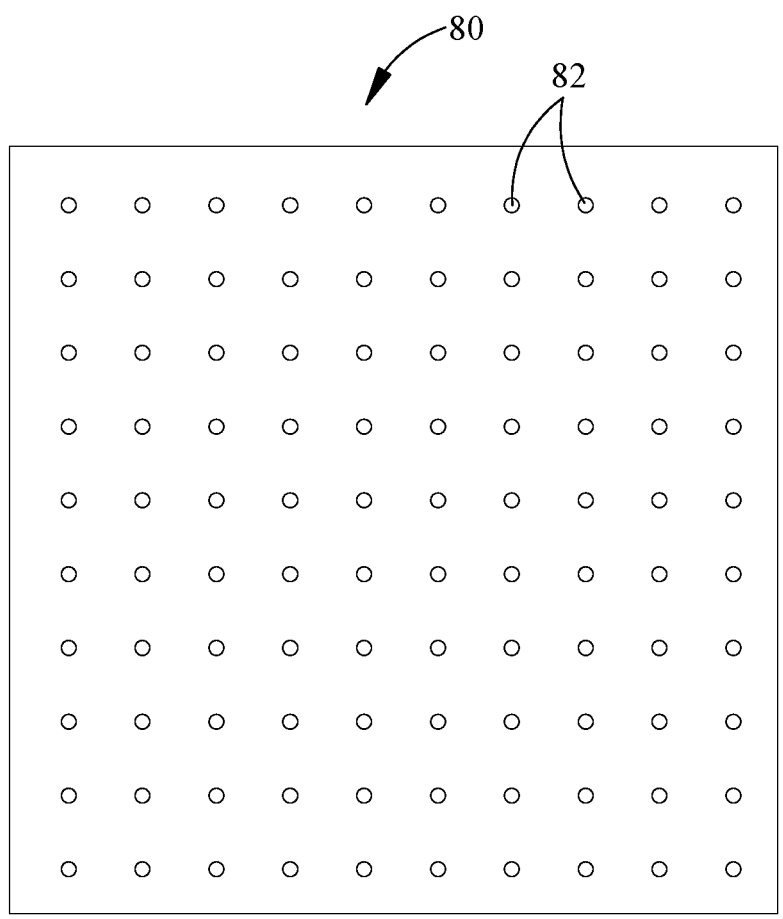
FIG. 8 is a top plan view of a calibration build job made by the machine of FIG. 1.

The calibration process begins by creating a calibration build job 80. This may be done by using one or both of the build beams 54, 56 to burn a pattern on paper or similar substrate. Alternatively, the build beams 54, 56 could be used to run a pattern of weld beads on an anodized metal plate, or to create a single-layer test build of fused powder. An exemplary calibration build job 80 is shown in FIG. 8. It comprises an array of measurement artifacts 82.

The measurement artifacts 82 are arranged in a predetermined pattern that permits measurement and evaluation of positional error over a specific area, such as the build surface 45. In the illustrated example, this predetermined pattern comprises a two-dimensional array of circles. Numerous other shapes and sizes of measurement artifacts may be used, including but not limited to points, lines, hashmarks, polygons, or open or closed curves, so long as they may be readily identified for measurement.

The calibration build job 80 is then imaged using the camera 70, resulting in a set of measurements of the positions of each measurement artifact 82. The set of measurements may be evaluated to determine the positional accuracy of the beam steering mechanisms 50A, 50B.

For example, the set of measurements may be evaluated (e.g., measured) to determine the position error of each measurement artifact 82 relative to its intended position.

In general, the calibration build job 80 is employed by obtaining the set of measurements described above, comparing the set of measurements to a predetermined standard, identifying if there is an alignment error of at least one of the beam steering mechanisms 50A, 50B based on the difference between the measurements and standard, and then correcting for any identified error by adjusting one or more of the beam steering mechanisms 50A, 50B.

As noted above, "calibration" or "adjustment" of an individual beam steering mechanism (e.g., galvo) may typically be effected by changing the parameters of a software transfer function that determines the value of a drive signal delivered to each galvo.

Once the camera 70 is properly calibrated, each of the steps described above for calibrating the beam steering mechanisms 50A, 50B starting with the provision of the calibrated camera 70 may be performed in an automated process using appropriate software (for example running on the controller 66). For example, the controller 66 may be used to operate the machine 10 to form the calibration build job 80; to operate the camera 70 to image the calibration build job 80; to evaluate the data from the camera 70; and finally, to implement adjustments (e.g., transfer function modifications) for the beam steering mechanisms 50A, 50B.

Subsequent to making adjustments, the steps of making a calibration build job, imaging the job, and comparing the image to a standard may be repeated as necessary until the job results are within predetermined acceptable tolerances.

In addition to, or as an alternative to, software adjustment, a mechanical adjustment may be provided. For example, the controller 66 may be programmed to determine when software adjustment is insufficient and to provide an alert to an operator that mechanical adjustment is required.

The entire process described above may be conducted separately for each steering mechanism 50A, 50B, resulting in all of the steering mechanisms being properly calibrated.

The calibration build job 80 described above may be used in various ways to calibrate the machine 10.

In one example, prior to production use of the machine 10, a calibration build job 80 may be completed and measured, a correction determined, the correction applied, and then the machine 10 may be used to build production components.

In another example, another calibration build job 80 may be carried out subsequent to applying the correction, to confirm that the correction was sufficient.

In another example, calibration build job 80 may be carried out at regular intervals, such as after a predetermined number of components are built, or after a certain number of layers are built for one component.

In the example described above, calibration of the scan fields of the beam steering mechanisms 50A, 50B is performed independently, with the assumption that accurate calibration will result in acceptable relative alignment between the two beam steering mechanisms 50A, 50B.

However, the beam steering mechanisms 50A, 50B are subject to relative misalignment that can cause various errors. Misalignment errors can occur in one or more axes. Examples of these errors are described with reference to FIGS. 9 through FIG. 14. In each of these figures, 84 designates a first weld bead formed by the first build beam 54 driven by the first beam steering mechanism 50A, and 86 designates to a second weld bead formed by the second build beam 56 driven by the second beam steering mechanism 50B. The first and second beads 84, 86 are representative of features such as walls, ribs, etc. that are desired to be made using more than one build beam but that must be continuous in the transitions between the sections made by each build beam. Building such structures requires accurate alignment in both X and Y axes.

Figure 9:
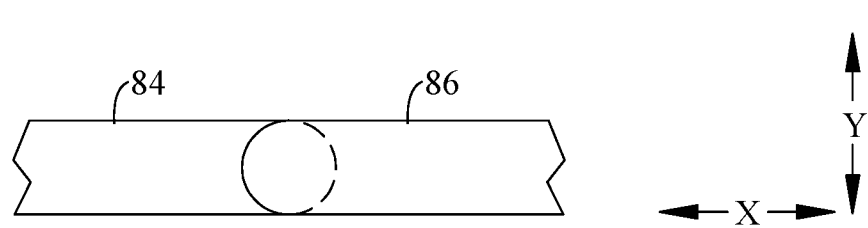
FIG. 9 is a schematic top plan view of first and second weld beads that are aligned and properly overlap.
Figure 10:
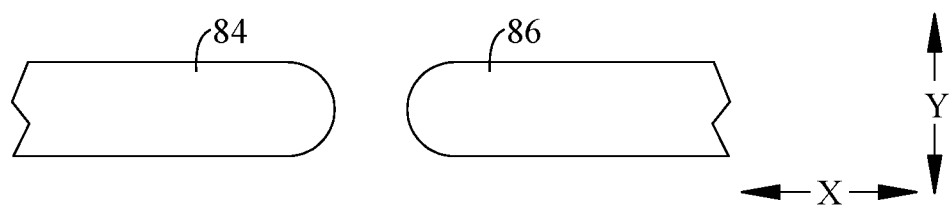
FIG. 10 is a schematic top plan view of first and second weld beads that are aligned but do not overlap.
Figure 11:
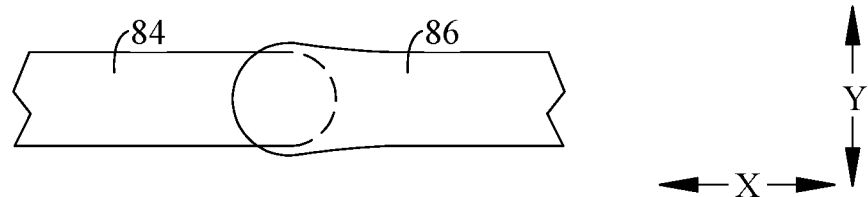
FIG. 11 is a schematic top plan view of first and second weld beads that are properly aligned but overlap excessively.

FIG. 9 shows a nominal or desired condition in which the first and second beads 84, 86 are aligned (e.g., Y-direction) and have a clean overlap (e.g., X-direction). FIG. 10 shows a condition in which the first and second beads 84, 86 are axially aligned (e.g., Y-direction) but have no overlap (e.g., error in X-position). FIG. 11 shows a condition in which the first and second beads 84, 86 are aligned but have an excess overlap of the second bead 86 over the first bead 84 (e.g., error in X-position).

Figure 12:
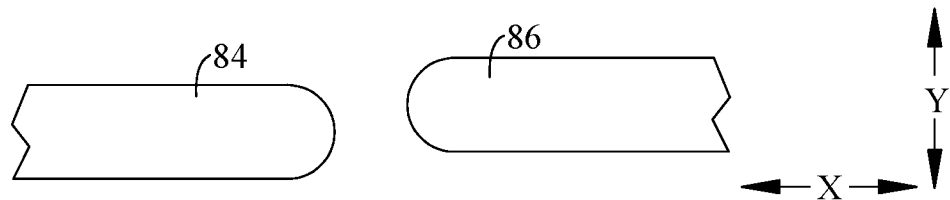
FIG. 12 is a schematic top plan view of first and second weld beads that are misaligned and do not overlap.
Figure 13:
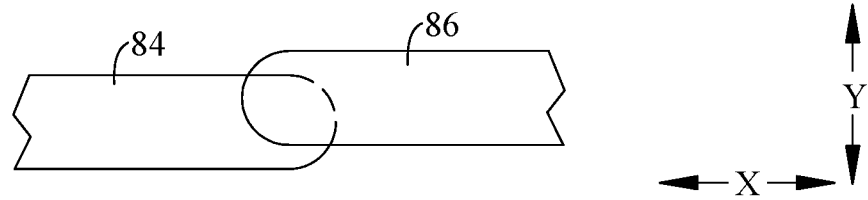
FIG. 13 is a schematic top plan view of first and second weld beads that are misaligned but do overlap properly.
Figure 14:
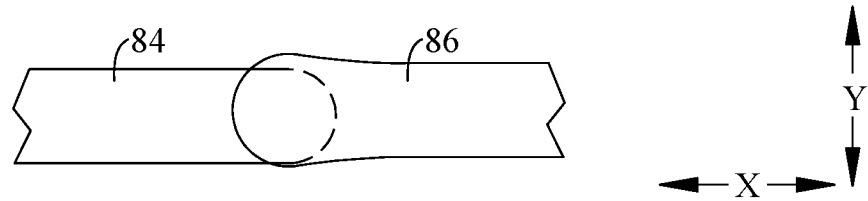
FIG. 14 is a schematic top plan view of first and second weld beads that are misaligned and overlap excessively.

FIG. 12 shows a condition in which the first and second beads 84, 86 are axially misaligned and also do not overlap (e.g., errors in X-position and Y-position). FIG. 13 shows a connection in which the first and second beads 84, 86 are misaligned in the Y-position but have a clean overlap. Finally, FIG. 14 illustrates a condition in which the first and second beads 84, 86 are misaligned and have an excess overlap of the second bead 86 over the first bead 84.

The camera 70 and associated hardware and software may also be used for the purpose of automating alignment of the scan fields of the beam steering mechanisms 50A and 50B to avoid the errors shown in FIGS. 10-14.

Figure 15:
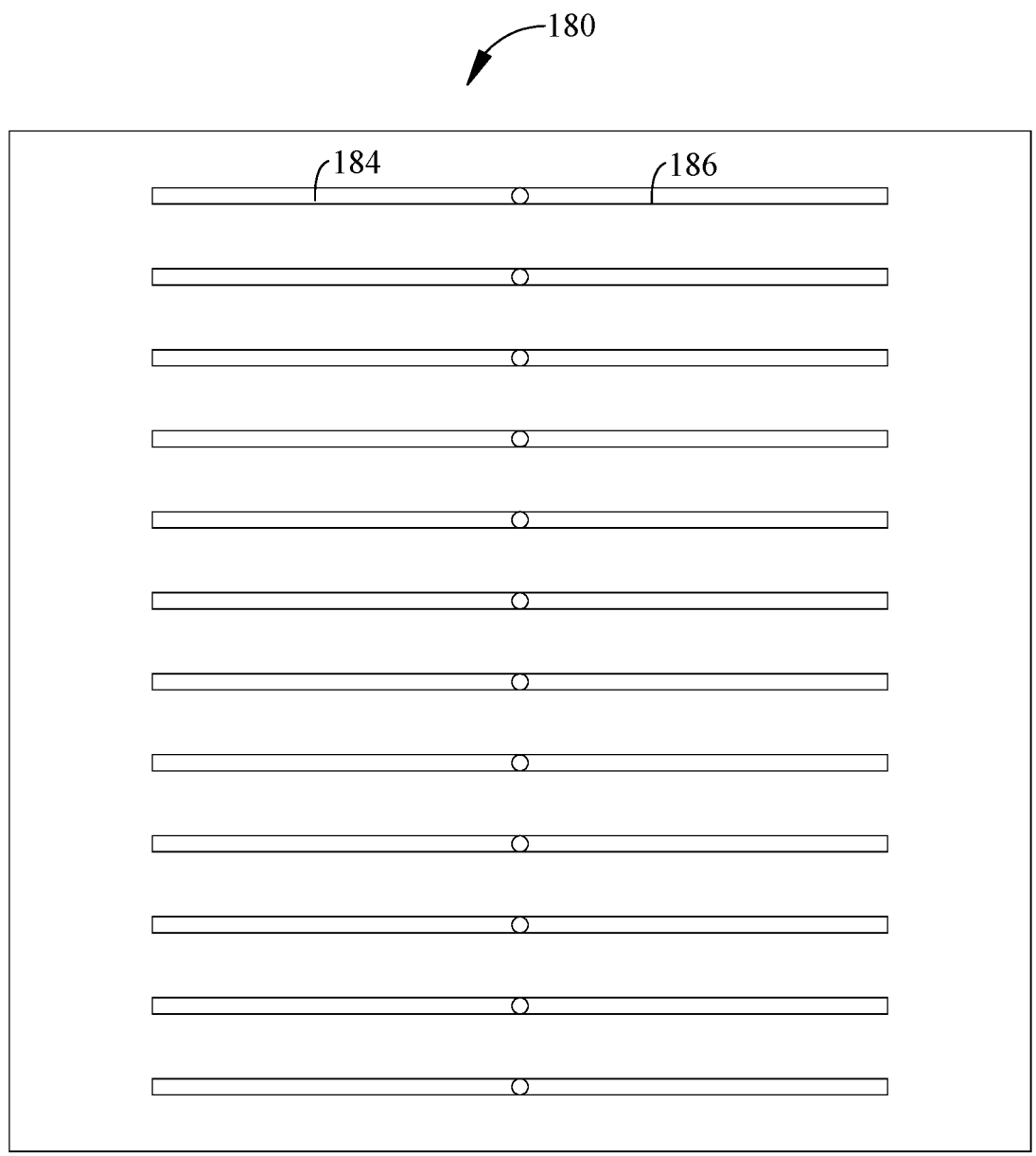
FIG. 15 is a top plan view of a calibration build job made by the machine of FIG. 1.

In one example process, a calibration build job 180 is created using the build beams 54, 56 to create a single-layer test build of fused powder. An exemplary calibration build job 180 is shown in FIG. 15. It comprises an array of first and second measurement artifacts, wherein the first measurement artifacts are formed by the first build beam 54, and the second measurement artifacts are formed by the second build beam 56.

In this example, the first measurement artifacts are first beads 184 and the second measurement artifacts are second beads 186. It will be understood that the first and second measurement artifacts could be any structure that will make relative alignment visible, such as a test pattern on paper, a bead on an anodized metal plate, halves of a part later, or multiple aligned parts such as beads, walls, or ribs.

The calibration build job 180 is then imaged using the camera 70, resulting in the set of measurements of the positions of each bead 184, 186. The set of measurements may be evaluated to determine the positional accuracy of the beam steering mechanisms 50A, 50B.

For example, the set of measurements may be evaluated to determine any position or distance error of each bead 184, 186 relative to the other bead 184, 186, thus identifying an alignment error of any one of the beam steering mechanisms 50A, 50B. Any errors may then be corrected by adjusting one or more of the beam steering mechanisms 50A, 50B.

Subsequent to making adjustments, the steps of making a calibration build job, imaging the job, and comparing the image to a standard may be repeated as necessary.

In addition to the applications described above, camera 70 and associated hardware and software may also be used for the purpose of in-process evaluation of a component build for an operating mode referred to as skywriting.

Figure 16:
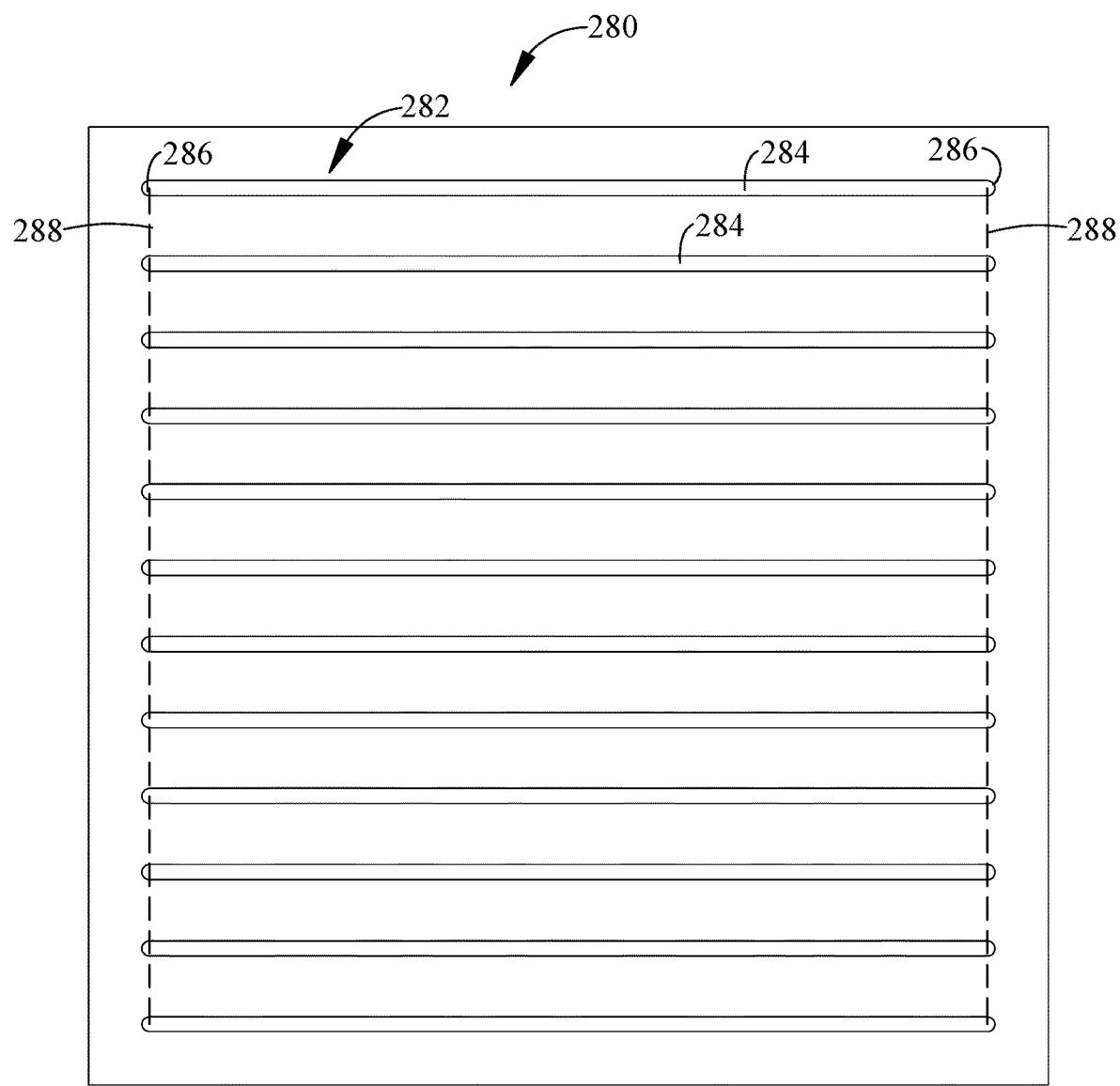
FIG. 16 is a top plan view of a calibration build job made by the machine of FIG. 1 comprising a hatch pattern.

In one example process, a calibration build job 280 is created using the build beams 54, 56 to create a single-layer test build of fused powder. An exemplary calibration build job 280 is shown in FIG. 16. In this example, the build job 280 defines a hatch pattern 282 including a plurality of parallel beads 284 each of which is intended to extend between terminal ends 286. In practice, the parallel beads 284 are formed in a "skywriting" procedure in which the build beam is scanned along a line, melting the powder 44. When the build beam reaches the end 286, the build beam is switched off or greatly reduced in power while the beam steering mechanism continues to move continuously and sweep through a virtual scan or contour scan path 288 until it reaches an end 286 of an adjacent bead 284. At that point, the build beam is switched on or increased to the default power level to begin forming the adjacent bead 284.

The calibration build job 280 is then imaged using the camera 70, resulting in the set of measurements of the positions of the ends 286 of each bead 284. The set of measurements may be evaluated to determine any position error of each end 286 relative to a predetermined standard, thus identifying any errors of any one of the beam steering mechanisms 50A, 50B. Any errors may then be corrected by adjusting one or more of the beam steering mechanisms 50A, 50B. For example, the programmed acceleration and deceleration (in either axis) or mark delay of the beam steering mechanism 50A, 50B may be adjusted.

Subsequent to making adjustments, the steps of making a calibration build job, imaging the job, and comparing the image to a standard may be repeated as necessary until the result is within predetermined tolerances. All of these processes may occur in an automated cycle as described above with respect to build job 80.

In addition to the applications described above, camera 70 and associated hardware and software may also be used for the purpose of in-process evaluation of a component build for contour closeouts.

Figure 17:
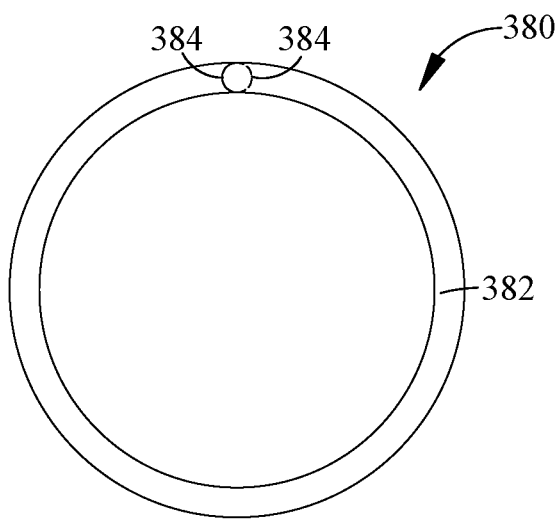
FIG. 17 is a top plan view of a calibration build job made by the machine of FIG. 1 comprising a circular bead.
Figure 18:
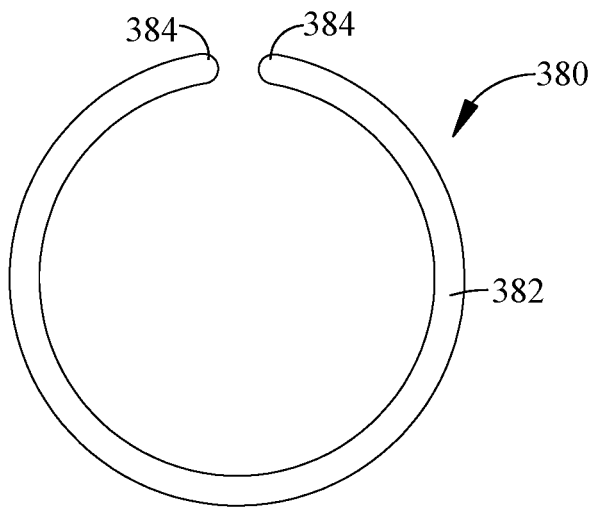
FIG. 18 is a top plan view of a calibration build job comprising a circular bead with ends that fail to overlap.
Figure 19:
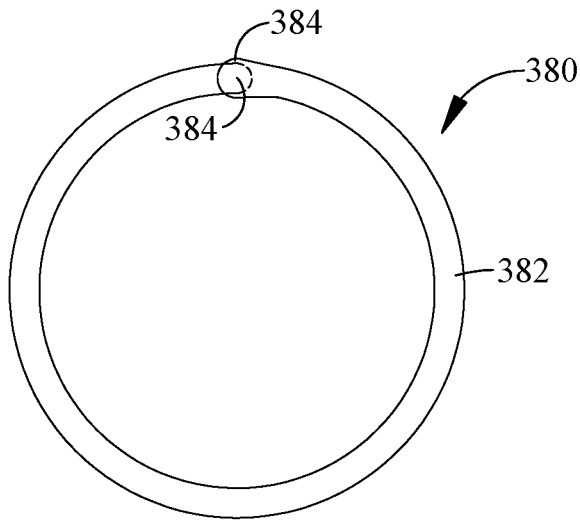
FIG. 19 is a top plan view of a calibration build job comprising a circular bead with ends having excessive overlap.

In one example process, a calibration build job 380 is created using one or both of the build beams 54, 56 to create a single-layer test build of fused powder. An exemplary calibration build job 380 is shown in FIG. 17. In this example, the build job 380 defines a circular bead 382 including terminal ends 384, or other closed shape. This serves as a test of the ability of the machine 10 to produce a closed perimeter shape. FIG. 17 shows the nominal intended shape, with a desired degree or pattern of overlap at the terminal ends. Miscalibration or misalignment can cause numerous errors. For example, FIG. 18 shows a circular bead 382 with terminal ends 384 that fail to meet, and FIG. 19 shows a circular bead 382 with terminal ends 384 that have excessive overlap.

The calibration build job 380 is then imaged using the camera 70, resulting in a set of measurements of the positions of the ends 384 of the bead 382, for example an actual amount or pattern of overlap. The set of measurements may be evaluated to determine any position error of the ends 384 relative to each other, thus identifying any error of any one of the beam steering mechanisms 50A, 50B. Any error may then be corrected by adjusting one or more of the beam steering mechanisms 50A, 50B. For example, the programmed contour offset settings of the beam steering mechanism may be adjusted.

Subsequent to making adjustments, the steps of making a calibration build job, imaging the job, and comparing the image to a standard may be repeated as necessary until the result is within predetermined tolerances. All of these process steps may occur in an automated cycle as described above with respect to build job 80.

In addition to, or as an alternative to use of the camera 70 to take the images described above, the machine 10 may be provided with a camera or other imaging device having a field-of-view that may be manipulated to track movements of the build beams 54 and/or 56. This may be accomplished, for example by mechanical movement of the camera body or by optical means such as movable lenses and mirrors. FIG. 1 illustrates such a device in the form of a camera 170 that may be panned and/or tilted. This type of device is referred to herein as a "down beam camera". One down beam camera 170 may be provided for each of the beam steering mechanisms 50A and 50B. As compared to the static camera 70 with fixed field-of-view described above, the down beam camera 170 with movable field-of-view has the advantage of being able to focus on individual laser passes, and the ability to image the overlap in alignment of small features in different areas of the build surface 45. It may provide a particular advantage in determining relative scan field alignments of the structures shown, for example, in FIG. 15, 16, or 17-19.

In addition to, or as an alternative to use of the camera 70 or down beam camera 170, another technique for automating calibration and/or alignment involves providing the machine 10 with one or more sensors effective to detect and quantify energy emissions from the melt pools 58, 60. The detected emissions may be mechanical in nature (e.g., acoustic) or may comprise electromagnetic energy. Examples of suitable sensors include but are not limited to photodiodes, photomultiplier tubes ("PMT"), or microphones. The sensors are referred to generically herein as "emissions sensors".

The emissions sensors, depicted schematically at reference 300 in FIG. 1, may be statically mounted within the housing 26 or they may be mounted so that they can be driven by one or more actuators (not shown) to track the position of the melt pools 58, 60. Alternatively, they may share an optical path with the respective build beams 54, 56. The emission sensors 300 are operably connected to the controller 66 or other suitable data reduction and storage equipment. In the illustrated example, two emission sensors 300 are provided, one for each of the melt pools 58, 60.

As shown in FIG. 20-25, the emissions sensors 300 provide output emissions data that can be represented in the form of a graph of amplitude of the sensed value (e.g., intensity) versus time. It is a property of the machine 10 configuration and the interaction of the build beam 54, 56 with the powder 44 that electromagnetic and acoustic emissions are significantly different when scanning the build beams 54, 56 over virgin material (e.g., powder) versus when re-scanning previously welded material. These differences are apparent in the output graphs of the emissions.

FIG. 20-25 show examples of this property. These figures illustrate representative first and second weld beads 84, 86 respectively in various position relationships corresponding to the depictions in FIG. 9-14 discussed above. FIGS. 20-25 also illustrate first and second graphs 302, 304 that illustrate amplitude of the sensed emission values for each bead 84, 86 versus time corresponding to the formation of the first and second beads 84, 86 as they are formed in a converging direction as shown by the arrows. This emissions data can be monitored as an indication of relative alignment and/or relative overlap between the first and second beads 84, 86.

Figure 20:
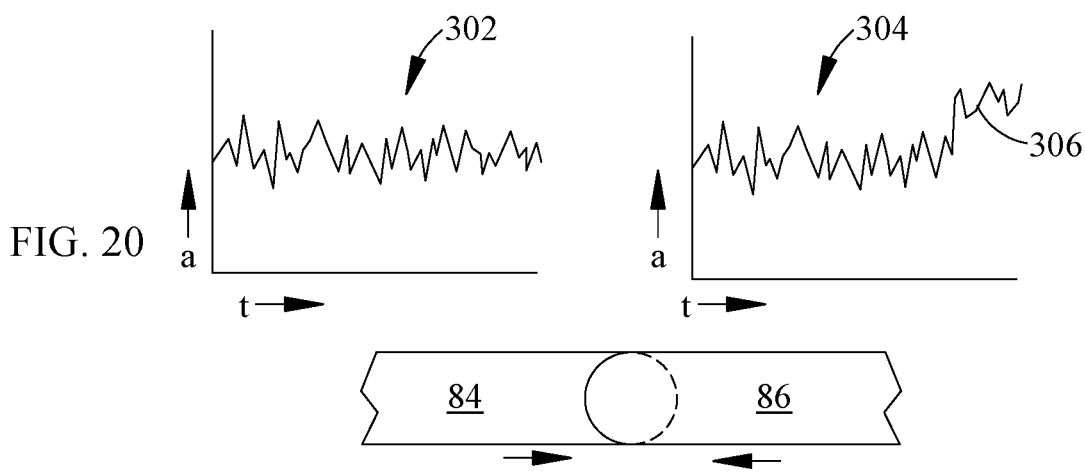
FIG. 20 is a schematic top plan view of first and second weld beads that are aligned and properly overlap, along with graphs showing emissions sensor data of the bead formation.

For example, FIG. 20 shows a nominal or desired condition in which first and second beads 84, 86 are aligned (e.g., Y-direction) and have a clean overlap (e.g., X-direction). The second graph 304 shows an increasing amplitude trend 306 representing the formation of the overlap area between the beads 84, 86.

FIG. 24 shows a connection in which the first and second beads 84, 86 are misaligned in the Y-position but have a clean overlap. The second graph 304 shows an increasing amplitude trend 308 that is similar to, but distinguishable from, increasing amplitude trend 306 shown in FIG. 20. For example, it may have a different (e.g., lower) average slope.

Figure 21:
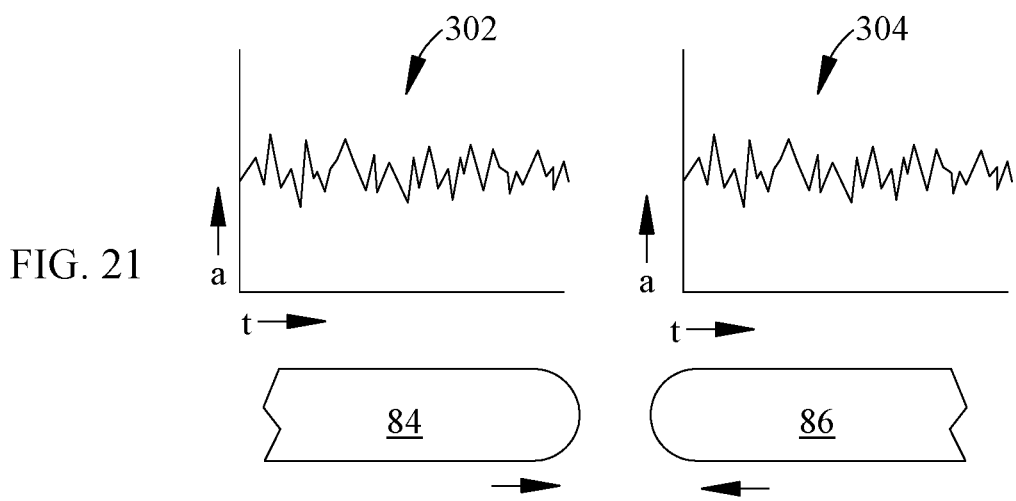
FIG. 21 is a schematic top plan view of first and second weld beads that are aligned but do not overlap, along with graphs showing emissions sensor data of the bead formation.

FIG. 21 shows a condition in which first and second beads 84, 86 are axially aligned (e.g., Y-direction) but have no overlap (e.g., error in X-position). FIG. 23 shows a condition in which the first and second beads 84, 86 are axially misaligned and also do not overlap (e.g., errors in X-position and Y-position). In both of these conditions, the build beams 54, 56 never encounter previously-fused material, and so no overall trend changes are depicted in the first and second graphs 302, 304.

Figure 22:
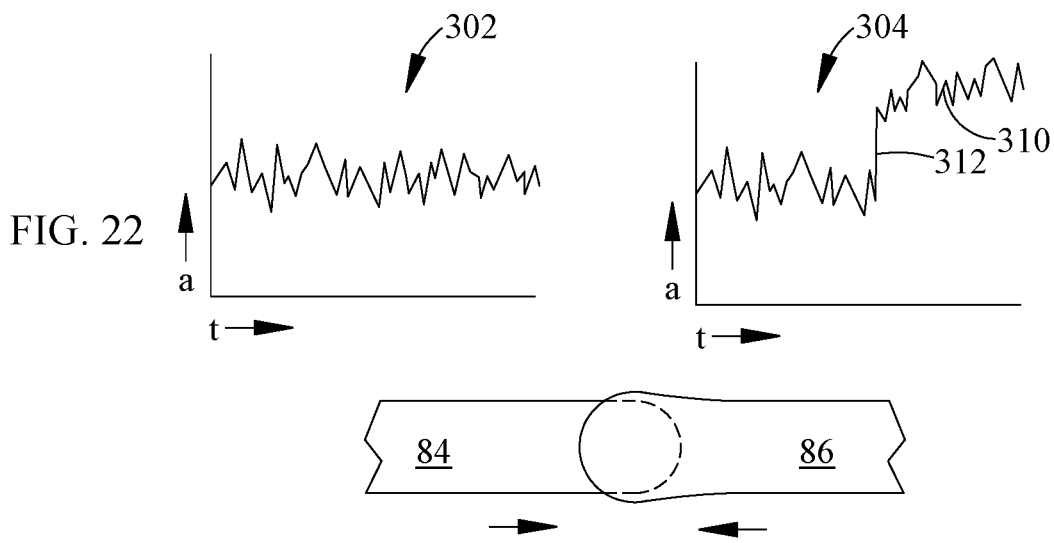
FIG. 22 is a schematic top plan view of first and second weld beads that are properly aligned but overlap excessively, along with graphs showing emissions sensor data of the bead formation.

FIG. 22 shows a condition in which first and second beads 84, 86 are aligned but have an excess overlap of the second bead 86 over the first bead 84 (e.g., error in X-position). The second graph 304 shows an increasing amplitude trend 310 representing the formation of the overlap area between the beads 84, 86. The increasing amplitude trend 310 in this condition exhibits a step increase or spike noted at 312. This emissions data provides a basis for distinguishing from the gradually increasing amplitude trend 306 shown in FIG. 20.

Finally, FIG. 25 illustrates a condition in which first and second beads 84, 86 are misaligned and have an excess overlap of the second bead 86 over the first bead 84. The second graph 304 shows an increasing amplitude trend 314 representing the formation of the overlap area between the beads 84, 86. This graph is similar to, but distinguishable from, increasing amplitude trend 310 shown in FIG. 22. For example, it may have a different (e.g., lower) average slope and lacks the spike of FIG. 22.

This emissions data can be used for the purpose of scan field alignment.

In one example process, a calibration build job is created using one or both of the build beams 54, 56 to create a single-layer test build of fused powder. For example, the calibration build job may comprise first and second beads 84, 86 as shown in FIG. 20. The first beads 84 are formed by the first build beam 54, and the second beads 86 are formed by the second build beam 56.

The calibration build job may be monitored during the build process using the emissions sensors 300, resulting in the set of measurements or emissions data in the form of graphs 302, 304. The emissions data may be evaluated to determine the positional accuracy of the beam steering mechanisms 50A, 50B.

For example, the emissions data may be evaluated to determine the overlap, or absence thereof, between beads 84, 86, thus identifying any alignment error of the beam steering mechanisms 50A, 50B. This may then be corrected by adjusting one or more of the beam steering mechanisms 50A, 50B.

Subsequent to making adjustments, the steps of making a calibration build job, monitoring emissions, and comparing the emissions data to a standard may be repeated as necessary.

Figure 26:
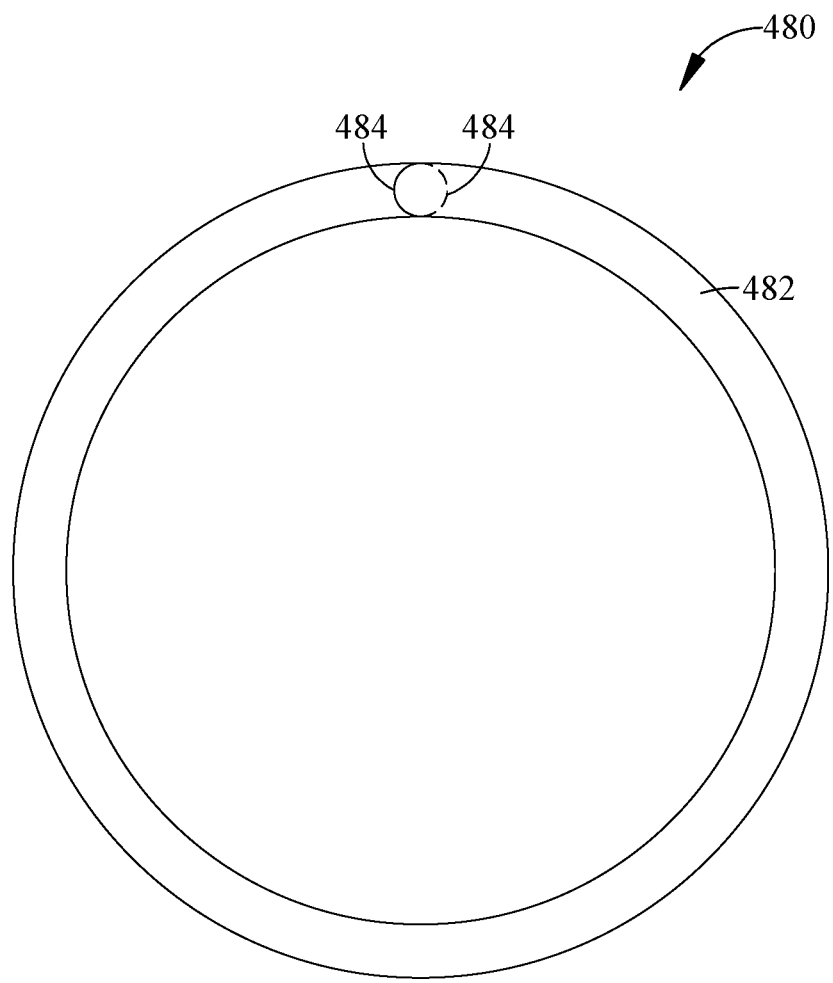
FIG. 26 is a top plan view of a calibration build job made by the machine of FIG. 1, comprising a circular bead.

In another example process, a calibration build job is created using one or both of the build beams 54, 56 to create a single-layer test build of fused powder. An exemplary calibration build job 480 is shown in FIG. 26. In this example, the build job 480 defines a circular bead 482 including terminal ends 484. This serves as a test of the ability of the machine 10 to produce a closed perimeter shape. FIG. 17 shows the nominal intended shape, with a desired degree of overlap at the terminal ends. Miscalibration or misalignment can cause numerous errors such as failure of the terminal ends 484 to meet, similar to the configuration shown in FIG. 21, or excessive overlap, similar to the configuration shown in FIG. 22. Graphs of the melt pool emissions (not shown) would have characteristics enabling these conditions to be identified.

The calibration build job is monitored during the build process using the emissions sensors 300, resulting in the set of measurements or emissions data in the form of graphs (not shown). The emissions data may be evaluated to determine the positional accuracy of the beam steering mechanisms 50A, 50B.

For example, the emissions data may be evaluated to determine the overlap, or absence thereof, between terminal ends 484, thus identifying any alignment error of the beam steering mechanisms 50A, 50B. Any errors may then be corrected by adjusting one or more of the beam steering mechanisms 50A, 50B. Adjustments may include, for example, a skywriting acceleration or deceleration, a delay, a beam power, a beam modulation frequency, a skywriting trajectory, a beam offset setting, a beam edge setting, a contour overlap setting, an acceleration of the beam steering mechanism, or a mark delay.

Subsequent to making adjustments, the steps of making a calibration build job, monitoring emissions, and evaluating emissions data may be repeated as necessary.

Figure 27:
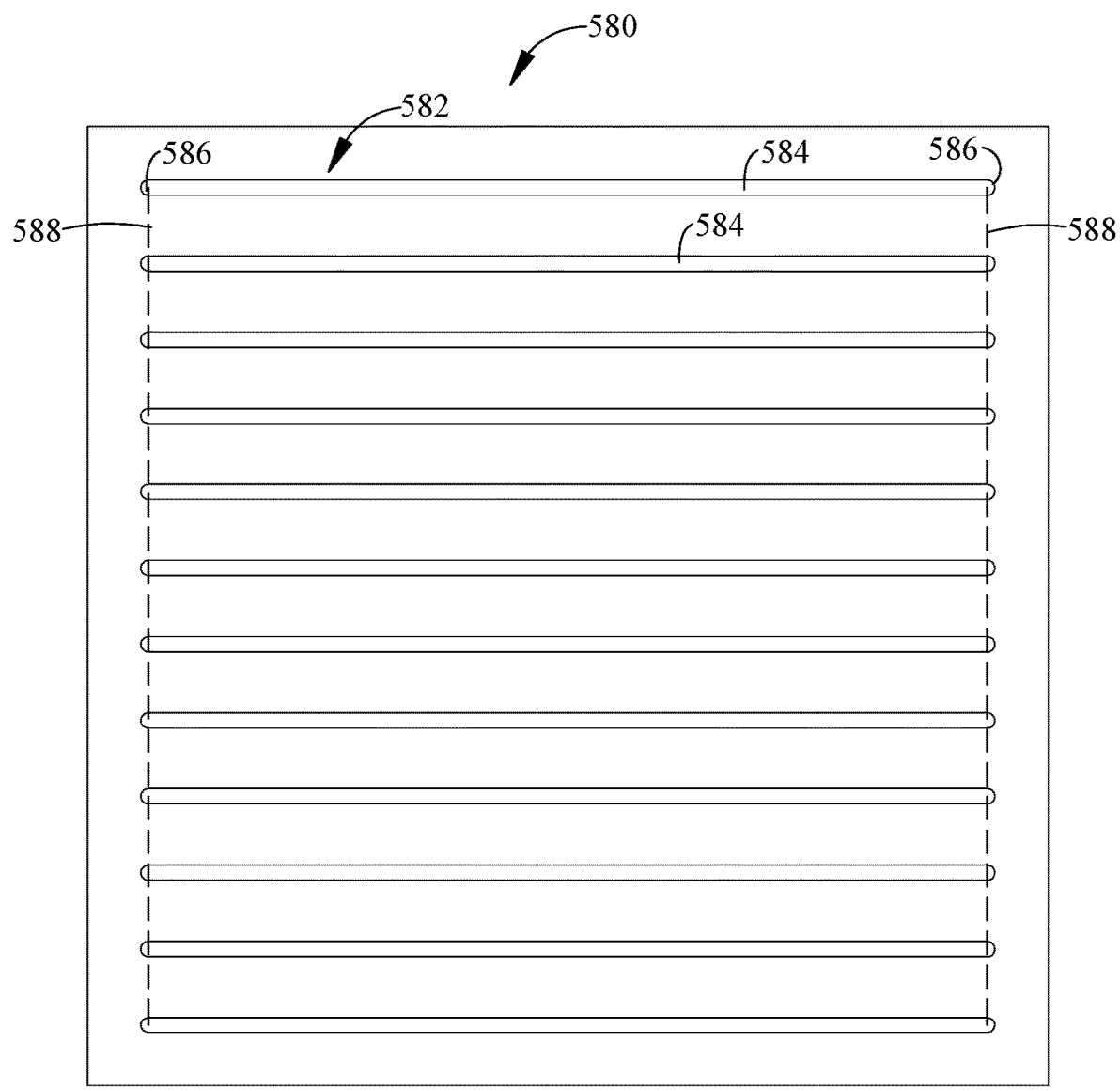
FIG. 27 is a top plan view of a calibration build job made by the machine of FIG. 1 comprising a hatch pattern.

In another example process, a calibration build job 580 is created using the build beams 54, 56 to create a single-layer test build of fused powder. An exemplary calibration build job 580 is shown in FIG. 27. In this example, the build job 580 defines a hatch pattern 582 including a plurality of parallel beads 584 each of which is intended to extend between terminal ends 586. In practice, the parallel beads 284 are formed in a skywriting procedure in which the build beam is scanned along a line, melting the powder 44. When the build beam reaches the end 586, the build beam is switched off or greatly reduced in power while the beam steering mechanism continues to move continuously and sweep through a virtual scan or contour scan path 588 until it reaches an end 586 of an adjacent bead 584. At that point, the build beam is switched on or increased to the default power level to begin forming the adjacent bead 584. Graphs of the melt pool emissions (not shown) would have characteristics enabling the crossover points between the beads 584 and the contour scan path 588 to be identified.

The calibration build job 580 may be monitored during the build process using the emissions sensors 300, resulting in the set of measurements or emissions data in the form of graphs. The emissions data may be evaluated to determine the positional accuracy of the beam steering mechanisms 50A, 50B.

For example, the emissions data may be evaluated to determine the overlap between beads 584 and contour scans 588, thus identifying any alignment error of the beam steering mechanisms 50A, 50B. Any errors may then be corrected by adjusting one or more of the beam steering mechanisms 50A, 50B. Adjustments may include, for example, a skywriting acceleration or deceleration, a delay, a beam power, a beam modulation frequency, a skywriting trajectory, a beam offset setting, a beam edge setting, a contour overlap setting, an acceleration of the beam steering mechanism, or a mark delay.

Subsequent to making adjustments, the steps of making a calibration build job, monitoring emissions, and evaluating emissions data may be repeated as necessary.

The methods described herein have several advantages over the prior art. In particular, they permit the automation of scan field calibration, scan field alignment, or both. This automation will provide a significant time reduction in the calibration/alignment processes. Furthermore, it will reduce machine to machine variability, as the calibration/alignment processes are no longer manual processes.

The foregoing has described apparatus and method for automated beam scan calibration, alignment, and adjustment. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any claims, abstract and drawings), or to any novel one, or any novel combination, of the steps of any method or process so disclosed.

Further aspects of the invention are provided by the subject matter of the following numbered clauses:

1. A method of calibrating a beam scan field of an additive manufacturing machine in which a radiant energy beam is used to selectively melt material to form a workpiece, the method comprising: directing a radiant energy beam using a beam steering mechanism to create a calibration build job on a substrate, the calibration build job including at least one measurement artifact created by the radiant energy beam; using a calibrated camera, collecting an image of the calibration build job; generating a set of measurements of the calibration build job from the image; comparing the measurements to a standard; in response to any one of the measurements deviating from the standard by more than a predetermined acceptable tolerance, adjusting the beam steering mechanism; and wherein the steps of directing, collecting, generating, comparing, and adjusting are carried out in response to automated commands from an electronic controller.

2. The method of any preceding clause further comprising repeating the steps of producing, directing, collecting, generating, comparing, and adjusting until the measurements are within the predetermined acceptable tolerance.

3. The method of any preceding clause wherein the step of adjusting the beam steering mechanism comprises modifying a software transfer function that defines operation of the beam steering mechanism.

4. The method of any preceding clause wherein the step of adjusting the beam steering mechanism comprises physical adjustment of the beam steering mechanism.

5. The method of any preceding clause wherein the calibrated camera is mounted into the machine with a fixed field-of-view.

6. The method of any preceding clause wherein: the machine includes two or more beam generators each including a directed energy source and a beam steering mechanism operable to produce a radiant energy beam; the directing step includes directing a radiant energy beam from each of the two or more beam generators so as to create the calibration build job on the substrate, wherein the calibration build job includes at least one measurement artifact created by each of the radiant energy beams.

7. The method of any preceding clause wherein each of the measurement artifacts is a portion of a workpiece.

8. The method of any preceding clause wherein the step of comparing the measurements to a standard includes evaluation of a relative position of the measurement artifacts.

9. The method of any preceding clause wherein the step of evaluating a relative position of the measurement artifacts includes using at least one down beam camera that has a movable field-of-view operable to track movement of a melt pool created by the radiant energy beams.

10. A method of calibrating beam scan fields of an additive manufacturing machine including two or more beam generators each including a radiant energy source and a beam steering mechanism, the method comprising: directing a radiant energy beam from each of the beam generators to selectively melt material, such that each radiant energy beam forms a separate portion of a build job, using a calibrated camera, collecting an image of the build job; determining the relative positions of the portions of the build job, based on the image; comparing the relative positions to a standard; in response to any one of the relative positions deviating from the standard by more than a predetermined acceptable tolerance, adjusting one or more of the beam generators; and wherein the steps of directing, collecting, determining, comparing, and adjusting are carried out in response to automated commands from an electronic controller.

11. The method of any preceding clause further comprising repeating the steps of directing, collecting, determining, comparing, and adjusting until the relative positions are within the predetermined acceptable tolerance.

12. The method of any preceding clause wherein the step of adjusting one or more of the beam generators comprises modifying a software transfer function that defines operation of one or more of the beam steering mechanisms.

13. The method of any preceding clause wherein the step of adjusting one or more of the beam generators comprises physical adjustment of one or more of the beam steering mechanisms.

14. The method of any preceding clause wherein the calibrated camera is mounted into the machine with a fixed field-of-view.

15. The method of claim 10 wherein the machine includes for each beam generator a down beam camera that has a movable field-of-view operable to track movement of a melt pool created by the radiant energy beam.

16. The method of any preceding clause wherein: the separate portions of the build job have at least one of: a predetermined amount of overlap with each other or a predetermined pattern of overlap with each other; and the step of comparing the relative positions includes determining at least one of: an amount of actual overlap or a pattern of actual overlap between the separate portions.

17. A method of calibrating beam scan fields for an additive manufacturing process in which two or more radiant energy beams are used to selectively melt material to form a workpiece, the method comprising: directing the two or more radiant energy beams using individual beam steering mechanisms so as to create a calibration build job on a substrate, the calibration build job including at least one portion created by each of the two or more radiant energy beams, wherein each of the two or more radiant energy beams generates a melt pool; using one or more emissions sensors, monitoring emissions from the melt pools; comparing a change of the emissions in areas where the portions created by each of the two or more radiant energy beams approach or overlap each other, to a predetermined standard; in response to the change of the emissions deviating from the standard by more than a predetermined acceptable tolerance, adjusting the beam steering mechanisms; and wherein the steps of directing, monitoring, comparing, and adjusting are carried out in response to automated commands from an electronic controller.

18. The method of any preceding clause wherein the emissions include at least one of electromagnetic energy or acoustic energy.

19. The method of any preceding clause further comprising repeating the steps of, directing, monitoring, comparing, and adjusting until the change of the emissions are within the predetermined acceptable tolerance.

20. The method of any preceding clause wherein the step of adjusting the beam steering mechanisms comprises modifying a software transfer function that defines operation of the beam steering mechanism.

21. The method of any preceding clause wherein the step of adjusting the beam steering mechanism comprises physical adjustment of the beam steering mechanism.

22. The method of any preceding clause wherein the one or more emissions sensors include an emissions sensor for each of the two or more beam steering mechanisms.

23. The method of any preceding clause wherein the one or more emission sensors are moveable to track movement of the melt pools created by the two or more radiant energy beams.

24. The method of any preceding clause wherein the predetermined standard includes a predetermined amount of overlap between the portions of the build job; and the step of comparing the change of the emissions includes determining an amount of actual overlap between the portions.

25. The method of any preceding clause wherein: the calibration build pattern includes a plurality of parallel beads extending between terminal ends; and the step of comparing the measurements to a standard includes determining a position of each of the terminal ends; and the step of adjusting the beam steering mechanism includes adjusting at least one of: a skywriting acceleration or deceleration, a delay, a beam power, a beam modulation frequency, a skywriting trajectory, a beam offset setting, a beam edge setting, a beam contour overlap setting, or a mark delay.

26. The method of any preceding clause wherein: the calibration build pattern includes a bead having two ends with a defined amount of overlap forming a closed shape; and the step of comparing the measurements includes determining an amount of actual overlap between the two ends; and the step of adjusting the calibration of the beam steering mechanism includes adjusting at least one of: a skywriting acceleration or deceleration, a delay, a beam power, a beam modulation frequency, a skywriting trajectory, a beam offset setting, a beam edge setting a beam contour overlap setting, or a mark delay.

27. A method of calibrating beam scan fields of an additive manufacturing machine including two or more beam generators each including a radiant energy source and a beam steering mechanism, the method comprising: using the beam steering mechanisms, directing the radiant energy beams to selectively melt material, such that each radiant energy beam forms a separate portion of a build job, wherein each radiant energy beam creates a melt pool; using one or more emissions sensors, monitoring emissions from the melt pools; comparing the emissions to a standard; in response to the emissions deviating from the standard by more than a predetermined acceptable tolerance, adjusting one or more of the beam generators; and wherein the steps of directing, monitoring, comparing, and adjusting are carried out in response to automated commands from an electronic controller.

28. The method of any preceding clause wherein the emissions include at least one of electromagnetic energy or acoustic energy.

29. The method of any preceding clause further comprising repeating the steps of producing, directing, monitoring, comparing, and adjusting until the emissions are within the predetermined acceptable tolerance.

30. The method of any preceding clause wherein the step of adjusting one or more of the beam generators comprises modifying a software transfer function that defines operation of one or more of the beam generators.

31. The method of any preceding clause wherein the step of adjusting one or more of the beam generators comprises physical adjustment of one or more of the beam steering mechanisms.

32. The method of any preceding clause wherein the one or more emissions sensors include an emissions sensor for each of the two or more beam generators.

33. The method of any preceding clause wherein the one or more emission sensors are operable to track movement of the melt pools created by the radiant energy beams.

34. The method of any preceding clause wherein the standard includes a predetermined amount of overlap between the separate portions of the build job; and the step of comparing the emissions includes determining an amount of actual overlap between the separate portions.

What is claimed is:

1. A method of calibrating a beam scan field of an additive manufacturing machine in which a radiant energy beam is used to selectively melt material to form a workpiece, the method comprising:
   directing a radiant energy beam using a beam steering mechanism to create a calibration build job on a substrate, the calibration build job including at least one measurement artifact created by the radiant energy beam;
   using a calibrated camera, collecting an image of the calibration build job;
   generating a set of measurements of the calibration build job from the image;
   comparing the measurements to a standard;
   in response to any one of the measurements deviating from the standard by more than a predetermined acceptable tolerance, adjusting the beam steering mechanism; and
   wherein the steps of directing, collecting, generating, comparing, and adjusting are carried out in response to automated commands from an electronic controller.

2. The method of claim 1 further comprising repeating the steps of directing, collecting, generating, comparing, and adjusting until the measurements are within the predetermined acceptable tolerance.

3. The method of claim 1 wherein the step of adjusting the beam steering mechanism comprises modifying a software transfer function that defines operation of the beam steering mechanism.

4. The method of claim 1 wherein the step of adjusting the beam steering mechanism comprises physical adjustment of the beam steering mechanism.

5. The method of claim 1 wherein the calibrated camera is mounted in the machine with a fixed field-of-view.

6. The method of claim 1 wherein:
   the machine includes two or more beam generators each including a directed energy source and a beam steering mechanism operable to produce a radiant energy beam;
   the directing step includes directing a radiant energy beam from each of the two or more beam generators so as to create the calibration build job on the substrate, wherein the calibration build job includes at least one measurement artifact created by each of the radiant energy beams.

7. The method of claim 6 wherein each of the measurement artifacts is a separate portion of a workpiece.

8. The method of claim 7 wherein the step of comparing the measurements to a standard includes evaluation of a relative position of the measurement artifacts.

9. The method of claim 8 wherein the step of evaluating a relative position of the measurement artifacts includes using at least one down beam camera that has a movable field-of-view operable to track movement of a melt pool created by the radiant energy beams.

10. The method of claim 8 further comprising repeating the steps of directing, collecting, determining, comparing, and adjusting until the relative positions are within the predetermined acceptable tolerance.

11. The method of claim 8 wherein:
   the separate portions of the workpiece have at least one of:
      a predetermined amount of overlap with each other or
      a predetermined pattern of overlap with each other; and
   the step of comparing the relative positions includes determining at least one of: an amount of actual overlap or a pattern of actual overlap between the separate portions.

12. The method of claim 6 wherein the machine includes for each beam generator a down beam camera that has a movable field-of-view operable to track movement of a melt pool created by the radiant energy beam.

13. A method of calibrating beam scan fields of an additive manufacturing machine including two or more beam generators each including a radiant energy source and a beam steering mechanism, the method comprising:
   using the beam steering mechanisms, directing a radiant energy beam from each of the beam generators to selectively melt material, such that each radiant energy beam forms a separate portion of a build job, wherein each radiant energy beam creates a melt pool;
   using one or more emissions sensors, monitoring emissions from the melt pools;
   comparing the emissions to a standard;
   in response to the emissions deviating from the standard by more than a predetermined acceptable tolerance, adjusting one or more of the beam generators; and
   wherein the steps of directing, monitoring, comparing, and adjusting are carried out in response to automated commands from an electronic controller.

14. The method of claim 13 wherein the emissions include at least one of electromagnetic energy or acoustic energy.

15. The method of claim 13 further comprising repeating the steps of directing, monitoring, comparing, and adjusting until the emissions are within the predetermined acceptable tolerance.

16. The method of claim 13, wherein comparing the emissions to a standard comprises comparing a change of the emissions in areas where the separate portions formed by each of the radiant energy beams approach or overlap each other, to a predetermined standard, and wherein the adjusting is in response to the change of the emissions deviating from the predetermined standard by more than the predetermined acceptable tolerance.

17. The method of claim 16 further comprising repeating the steps of directing, monitoring, comparing, and adjusting until the change of the emissions are within the predetermined acceptable tolerance.

18. The method of claim 13 wherein the step of adjusting one or more of the beam generators comprises modifying a software transfer function that defines operation of one or more of the beam generators.

19. The method of claim 13 wherein the step of adjusting one or more of the beam generators comprises physical adjustment of one or more of the beam steering mechanisms.

20. The method of claim 13 wherein the one or more emissions sensors include an emissions sensor for each of the two or more beam generators.

21. The method of claim 13 wherein the one or more emission sensors are operable to track movement of the melt pools created by the radiant energy beams.

22. The method of claim 13 wherein the standard includes a predetermined amount of overlap between the separate portions of the build job; and
the step of comparing the emissions includes determining an amount of actual overlap between the separate portions.

23. The method of claim 16 wherein:
the build job includes a plurality of parallel beads extending between terminal ends; and
the step of comparing the change of the emissions includes determining a position of each of the terminal ends; and
the step of adjusting the one or more of the beam generators includes adjusting at least one of: a skywriting acceleration or deceleration, a delay, a beam power, a beam modulation frequency, a skywriting trajectory, a beam offset setting, a beam edge setting, a beam contour overlap setting, or a mark delay.

24. The method of claim 16 wherein:
the build job includes a bead having two ends with a defined amount of overlap forming a closed shape; and
the step of comparing the change of the emissions includes determining an amount of actual overlap between the two ends; and
the step of adjusting the one or more of the beam generators includes adjusting at least one of: a skywriting acceleration or deceleration, a delay, a beam power, a beam modulation frequency, a skywriting trajectory, a beam offset setting, a beam edge setting a beam contour overlap setting, or a mark delay.

* * * * *